(12) United States Patent
Fausak

(10) Patent No.: US 9,225,809 B1
(45) Date of Patent: *Dec. 29, 2015

(54) CLIENT-SERVER COMMUNICATION VIA PORT FORWARD

(75) Inventor: Andrew T. Fausak, San Jose, CA (US)

(73) Assignee: WYSE TECHNOLOGY L.L.C., San Jose, CA (US)

( * ) Notice: Subject to any disclaimer, the term of this patent is extended or adjusted under 35 U.S.C. 154(b) by 134 days.

This patent is subject to a terminal disclaimer.

(21) Appl. No.: 13/487,134

(22) Filed: Jun. 1, 2012

Related U.S. Application Data

(60) Provisional application No. 61/521,736, filed on Aug. 9, 2011, provisional application No. 61/515,277, filed on Aug. 4, 2011.

(51) Int. Cl.
*G06F 15/16* (2006.01)
*H04L 29/08* (2006.01)
*H04L 29/06* (2006.01)
(Continued)

(52) U.S. Cl.
CPC .............. *H04L 69/321* (2013.01); *H04L 69/32* (2013.01); *G06F 5/00* (2013.01); *H04L 41/5054* (2013.01); *H04L 63/02* (2013.01); *H04L 63/166* (2013.01); *H04L 63/168* (2013.01); *H04L 69/08* (2013.01); *H04L 69/162* (2013.01); *H04L 69/18* (2013.01); *H04L 69/22* (2013.01); *H04L 69/24* (2013.01); *H04L 69/26* (2013.01); *H04L 69/322* (2013.01); *H04L 69/326* (2013.01)

(58) Field of Classification Search
CPC ....... H04L 69/08; H04L 69/162; H04L 69/18; H04L 69/22; H04L 69/24; H04L 69/26; H04L 69/32; H04L 69/321; H04L 69/322; H04L 69/326; H04L 41/5054; H04L 63/02; H04L 63/166; H04L 63/168; G06F 5/00
USPC .......................................................... 709/203
See application file for complete search history.

(56) References Cited

U.S. PATENT DOCUMENTS

| | | | |
|---|---|---|---|
| 5,452,447 A | 9/1995 | Nelson et al. | 1/1 |
| 6,016,318 A | 1/2000 | Tomoike | 370/401 |
| 6,105,073 A | 8/2000 | Choung | 719/321 |

(Continued)

OTHER PUBLICATIONS

International Search Report and Written Opinion for International Application PCT/US2012/048184, Oct. 9, 2012.

(Continued)

*Primary Examiner* — Blake Rubin
(74) *Attorney, Agent, or Firm* — Baker Botts L.L.P.

(57) ABSTRACT

Systems and methods for communicating data between client and server are provided. Method includes facilitating creation of connection comprising tunnel with channels between client side logical interface and server side logical interface. Each channel is associated with port forward of the client side logical interface and the server side logical interface. Client side logical interface and server side logical interface reside on opposite sides of firewall. Client side logical interface is for client protocol interfaces. Server side logical interface is for server protocol interfaces. Method includes receiving data unit for transmission between one of plural clients of client side logical interface and one of plural servers of server side logical interface via connection comprising tunnel. Data unit is associated with OSI model stack identifying source or destination of data unit. Client or server side logical interface provides access to protocols for modifying identified source or destination of data unit.

21 Claims, 16 Drawing Sheets

(51) Int. Cl.
  *H04L 12/24* (2006.01)
  *G06F 5/00* (2006.01)

(56) References Cited

U.S. PATENT DOCUMENTS

| | | | |
|---|---|---|---|
| 6,169,992 B1 | 1/2001 | Beall et al. | 1/1 |
| 6,356,863 B1 * | 3/2002 | Sayle | 703/27 |
| 6,446,137 B1 | 9/2002 | Vasudevan et al. | 719/330 |
| 6,678,827 B1 | 1/2004 | Rothermel et al. | 726/6 |
| 6,769,022 B1 | 7/2004 | DeKoning et al. | 709/223 |
| 6,823,393 B1 * | 11/2004 | Hericourt | 709/230 |
| 7,028,333 B2 | 4/2006 | Tuomenoksa et al. | 726/3 |
| 7,177,930 B1 | 2/2007 | LoPresti | 709/224 |
| 7,343,290 B2 | 3/2008 | Breuer | 704/270 |
| 7,356,841 B2 | 4/2008 | Wilson et al. | 726/15 |
| 7,457,626 B2 | 11/2008 | Bahl | 455/450 |
| 7,483,994 B1 | 1/2009 | Stephens et al. | 709/230 |
| 7,650,500 B2 | 1/2010 | Matoba | 713/153 |
| 7,734,647 B2 | 6/2010 | Suhonen et al. | 707/781 |
| 7,784,095 B2 | 8/2010 | Valenci | 726/15 |
| 7,837,560 B2 | 11/2010 | Wiltshire et al. | 463/42 |
| 7,853,679 B2 | 12/2010 | Khemani et al. | 709/223 |
| 8,079,059 B1 | 12/2011 | Lee | 726/1 |
| 8,095,786 B1 | 1/2012 | Kshirsagar et al. | 713/152 |
| 8,199,731 B2 | 6/2012 | Bourque | 370/338 |
| 8,555,372 B2 | 10/2013 | Walker et al. | 726/12 |
| 8,612,862 B2 | 12/2013 | Mascarenhas et al. | 715/738 |
| 2001/0047406 A1 | 11/2001 | Araujo et al. | 709/223 |
| 2002/0052199 A1 | 5/2002 | Sundaram et al. | 455/428 |
| 2002/0053031 A1 | 5/2002 | Bendinelli et al. | 713/201 |
| 2002/0087729 A1 * | 7/2002 | Edgar | 709/246 |
| 2002/0118671 A1 | 8/2002 | Staples et al. | 370/352 |
| 2002/0157023 A1 | 10/2002 | Callahan et al. | 713/201 |
| 2002/0162021 A1 | 10/2002 | Audebert et al. | 713/201 |
| 2003/0028650 A1 | 2/2003 | Chen et al. | 709/229 |
| 2003/0070005 A1 | 4/2003 | Mukundan et al. | 709/330 |
| 2003/0112755 A1 * | 6/2003 | McDysan | 370/230 |
| 2003/0145230 A1 | 7/2003 | Chiu et al. | 713/201 |
| 2003/0145315 A1 | 7/2003 | Aro et al. | 717/170 |
| 2003/0149741 A1 | 8/2003 | Krooss | 709/217 |
| 2003/0191803 A1 | 10/2003 | Chinnici et al. | 709/203 |
| 2003/0217149 A1 * | 11/2003 | Crichton et al. | 709/225 |
| 2004/0054748 A1 * | 3/2004 | Ackaouy et al. | 709/214 |
| 2004/0088448 A1 | 5/2004 | Joshi et al. | 710/15 |
| 2004/0154028 A1 | 8/2004 | Wang et al. | 719/330 |
| 2004/0174814 A1 | 9/2004 | Futral | 370/231 |
| 2004/0255048 A1 | 12/2004 | Lev Ran et al. | 709/249 |
| 2005/0166209 A1 * | 7/2005 | Merrick et al. | 719/310 |
| 2005/0193103 A1 | 9/2005 | Drabik | 709/221 |
| 2005/0193104 A1 | 9/2005 | Mason et al. | 709/223 |
| 2005/0193118 A1 | 9/2005 | Le et al. | 709/227 |
| 2005/0208947 A1 | 9/2005 | Bahl | 455/450 |
| 2006/0074618 A1 | 4/2006 | Miller et al. | 703/13 |
| 2006/0182083 A1 | 8/2006 | Nakata et al. | 370/352 |
| 2006/0190719 A1 | 8/2006 | Rao et al. | 713/160 |
| 2006/0195547 A1 | 8/2006 | Sundarrajan | |
| 2006/0195895 A1 | 8/2006 | Ben-Shachar et al. | 726/11 |
| 2006/0195899 A1 | 8/2006 | Ben-Shachar et al. | 726/12 |
| 2006/0288237 A1 | 12/2006 | Goodwill et al. | 713/193 |
| 2007/0056032 A1 | 3/2007 | Valenci | 726/15 |
| 2007/0074280 A1 | 3/2007 | Callaghan | 726/12 |
| 2007/0130574 A1 | 6/2007 | Gokhale | |
| 2007/0174479 A1 | 7/2007 | Sperry et al. | 709/233 |
| 2007/0214232 A1 * | 9/2007 | Belimpasakis et al. | 709/217 |
| 2007/0276950 A1 | 11/2007 | Dadhia | 709/229 |
| 2007/0283367 A1 * | 12/2007 | Brabson et al. | 719/330 |
| 2008/0002578 A1 | 1/2008 | Coffman | |
| 2008/0040455 A1 | 2/2008 | MacLeod et al. | 709/220 |
| 2008/0043760 A1 | 2/2008 | Venkatraman et al. | 370/401 |
| 2008/0098472 A1 | 4/2008 | Enomoto et al. | 726/12 |
| 2008/0184276 A1 | 7/2008 | Jong | 719/321 |
| 2008/0222665 A1 | 9/2008 | Prevost | 719/330 |
| 2008/0225753 A1 | 9/2008 | Khemani et al. | 370/255 |
| 2008/0263572 A1 | 10/2008 | Yang | 719/330 |
| 2008/0270612 A1 | 10/2008 | Malakapalli et al. | 709/227 |
| 2009/0006537 A1 | 1/2009 | Palekar et al. | 709/203 |
| 2009/0158418 A1 * | 6/2009 | Rao et al. | 726/12 |
| 2009/0287772 A1 * | 11/2009 | Stone et al. | 709/203 |
| 2009/0292850 A1 | 11/2009 | Barrall et al. | 710/301 |
| 2009/0316719 A1 * | 12/2009 | Baron et al. | 370/465 |
| 2009/0319850 A1 | 12/2009 | Baek | |
| 2009/0327905 A1 | 12/2009 | Mascarenhas et al. | 715/738 |
| 2010/0088767 A1 | 4/2010 | Weese | 726/23 |
| 2010/0095019 A1 * | 4/2010 | Hannel et al. | 709/232 |
| 2010/0131669 A1 | 5/2010 | Srinivas et al. | 709/233 |
| 2010/0217874 A1 | 8/2010 | Anantharaman et al. | 709/228 |
| 2010/0281286 A1 | 11/2010 | Hatasaki et al. | 713/324 |
| 2010/0312863 A1 | 12/2010 | Mohr | 709/220 |
| 2011/0004680 A1 | 1/2011 | Ryman | 709/224 |
| 2011/0016309 A1 | 1/2011 | Motoyama | 713/153 |
| 2011/0138457 A1 * | 6/2011 | Jolfaei | 726/14 |
| 2011/0153793 A1 | 6/2011 | Tan | 709/222 |
| 2011/0153831 A1 * | 6/2011 | Mutnuru et al. | 709/226 |
| 2011/0264905 A1 | 10/2011 | Ovsiannikov | 713/151 |
| 2011/0296053 A1 | 12/2011 | Medved et al. | 709/241 |
| 2012/0005741 A1 * | 1/2012 | Xie | 726/11 |
| 2012/0011340 A1 | 1/2012 | Flynn et al. | 711/171 |
| 2012/0036231 A1 * | 2/2012 | Thakur et al. | 709/220 |
| 2012/0042060 A1 | 2/2012 | Jackowski et al. | 709/224 |
| 2012/0066679 A1 | 3/2012 | Pappas et al. | 718/1 |
| 2012/0317243 A1 | 12/2012 | Gao et al. | 709/219 |
| 2013/0054817 A1 | 2/2013 | Moen et al. | 709/227 |
| 2013/0201979 A1 * | 8/2013 | Iyer et al. | 370/338 |
| 2013/0298201 A1 * | 11/2013 | Aravindakshan et al. | 726/4 |
| 2013/0325934 A1 | 12/2013 | Fausak et al. | 709/203 |

OTHER PUBLICATIONS

U.S. Appl. No. 13/487,131, filed Jun. 1, 2012, Fausak.
U.S. Appl. No. 13/487,129, filed Jun. 1, 2012, Fausak.
U.S. Appl. No. 13/487,124, filed Jun. 1, 2012, Fausak.
U.S. Appl. No. 13/487,133, filed Jun. 1, 2012, Fausak.
U.S. Appl. No. 13/487,139, filed Jun. 1, 2012, Fausak.
U.S. Appl. No. 13/487,138, filed Jun. 1, 2012, Fausak.
U.S. Appl. No. 13/487,140, filed Jun. 1, 2012, Fausak.
PCT International Preliminary Report on Patentability for International Application PCT/US/2012/048184, Apr. 3, 2014.

* cited by examiner

1400A

```
Facilitate creation of a connection comprising a tunnel with one or more
channels between a client side logical interface and a server side logical
interface, wherein each channel is associated with a port forward of the client
side logical interface and the server side logical interface, wherein the client side
logical interface and the server side logical interface reside on opposite sides of
a firewall, wherein the client side logical interface is for one or more client
protocol interfaces, and wherein the server side logical interface is for one or
more server protocol interfaces.
1410A
```

```
Receive a data unit for transmission between one of plural clients of the client
side logical interface and one of plural servers of the server side logical interface
via the connection comprising the tunnel, wherein the data unit is associated with
an open systems interconnection (OSI) model stack identifying a source or a
destination of the data unit, and wherein the client side logical interface or the
server side logical interface provides access to one or more protocols for
modifying the identified source or destination of the data unit and for transmitting
the data unit.
1420A
```

Facilitate transmission of the data unit via the connection comprising the tunnel.
1430A

FIG. 14A

CLIENT-SERVER COMMUNICATION VIA PORT FORWARD

CROSS-REFERENCES TO RELATED APPLICATIONS

The present application claims the benefit of priority from U.S. Provisional Patent Application Ser. No. 61/521,736, entitled, "REMOTE GATEWAY CLIENT PROXY AND SYSTEMS," filed on Aug. 9, 2011 and U.S. Provisional Patent Application Ser. No. 61/515,277, entitled "METHOD AND APPARATUS FOR REMOTE GATEWAY CLIENT PROXY", filed on Aug. 4, 2011, both of which are hereby incorporated by reference in their entirety for all purposes.

FIELD

The disclosure relates in general to remote computing or client-server computer systems, and more particularly to client-server communication via port forward.

BACKGROUND

Terminal services gateway is a well-known specific gateway interface for tunneling communications between clients and servers implementing operating systems compatible with the terminal services gateway interface, e.g., Microsoft Windows 7® or Microsoft Windows Server®. Secure shell is a well-known global secure network communication protocol for communication between remote clients and servers. Many machines running substantially arbitrary operating systems may communicate via secure shell. However, terminal services gateway, and other specific gateway interfaces, may lack a universal interface to allow a substantially arbitrary client computing device to interact with a service implementing terminal services gateway communication. As the foregoing illustrates, an approach to allowing a client implementing a global secure network communication protocol, e.g., secure shell, to communicate with a service implementing a specific gateway interface, e.g., terminal services gateway, may be desirable.

SUMMARY

In some aspects, a method for communicating data between a client and a server is provided. The method may include facilitating creation of a connection comprising a tunnel with one or more channels between a client side logical interface and a server side logical interface, wherein each channel is associated with a port forward of the client side logical interface and the server side logical interface, wherein the client side logical interface and the server side logical interface reside on opposite sides of a firewall, wherein the client side logical interface is for one or more client protocol interfaces, and wherein the server side logical interface is for one or more server protocol interfaces. The method may include receiving a data unit for transmission between one of plural clients of the client side logical interface and one of plural servers of the server side logical interface via the connection comprising the tunnel, wherein the data unit is associated with an open systems interconnection (OSI) model stack identifying a source or a destination of the data unit, and wherein the client side logical interface or the server side logical interface provides access to one or more protocols for modifying the identified source or destination of the data unit and for transmitting the data unit. The method may include facilitating transmission of the data unit via the connection comprising the tunnel.

In some aspects, a non-transitory machine-readable medium comprising instructions stored therein, the instructions executable by one or more processors to perform one or more operations, is provided. The instructions may include code for facilitating creation of a connection comprising a tunnel with one or more channels between a client side logical interface and a server side logical interface, wherein each channel is associated with a port forward of the client side logical interface and the server side logical interface, wherein the client side logical interface and the server side logical interface reside on opposite sides of a firewall, wherein the client side logical interface is for one or more client protocol interfaces, and wherein the server side logical interface is for one or more server protocol interfaces. The instructions may include code for receiving a data unit for transmission between one of plural clients of the client side logical interface and one of plural servers of the server side logical interface via the connection comprising the tunnel, wherein the data unit is associated with an open systems interconnection (OSI) model stack identifying a source or a destination of the data unit, and wherein the client side logical interface or the server side logical interface provides access to one or more protocols for modifying the identified source or destination of the data unit and for transmitting the data unit. The instructions may include code for facilitating transmission of the data unit via the connection comprising the tunnel.

In some aspects, a system is provided. The system may include one or more modules configured to facilitate creation of a connection comprising a tunnel with one or more channels between a client side logical interface and a server side logical interface, wherein each channel is associated with a port forward of the client side logical interface and the server side logical interface, wherein the client side logical interface and the server side logical interface reside on opposite sides of a firewall, wherein the client side logical interface is for one or more client protocol interfaces, and wherein the server side logical interface is for one or more server protocol interfaces. The system may include one or more modules configured to receive a data unit for transmission between one of plural clients of the client side logical interface and one of plural servers of the server side logical interface via the connection comprising the tunnel, wherein the data unit is associated with an open systems interconnection (OSI) model stack identifying a source or a destination of the data unit, and wherein the client side logical interface or the server side logical interface provides access to one or more protocols for modifying the identified source or destination of the data unit and for transmitting the data unit. The system may include one or more modules configured to facilitate transmission of the data unit via the connection comprising the tunnel.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

BRIEF DESCRIPTION OF THE DRAWINGS

FIG. 14A is a flow chart illustrating an example of an operation of a first logical interface.

DETAILED DESCRIPTION

Figure 1:
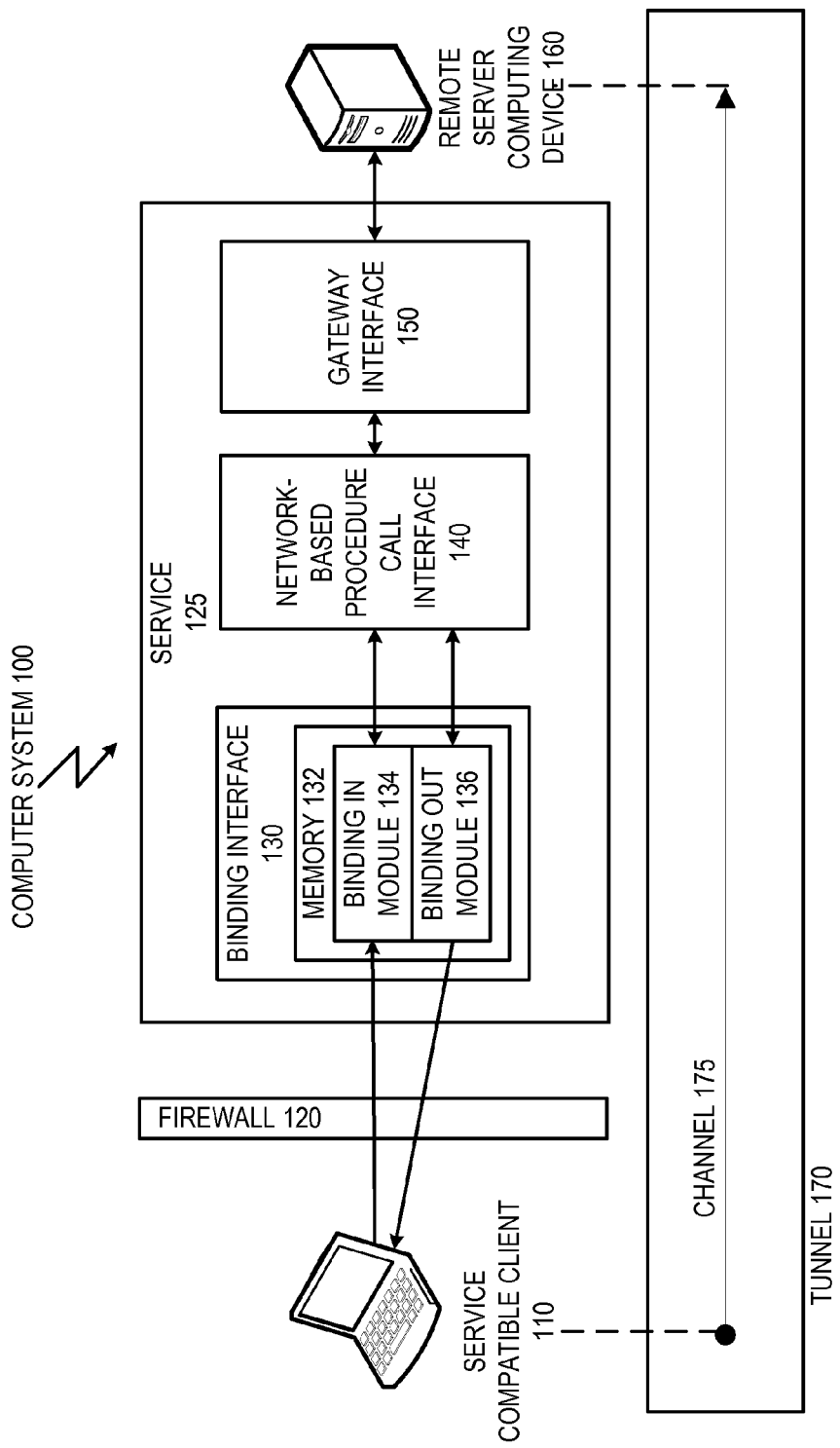
FIG. 1 illustrates an example of a client-server computer system with a service compatible client.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

In one aspect, the subject technology relates to a remote procedure call frame and filter (RPCFF) host that facilitates interfacing a proprietary remote server (e.g., a desktop computer running a Microsoft Window® operating system implementing Microsoft Remote Procedure Cant) with a non-proprietary client computing device (e.g., a laptop computer implementing a Linux Ubuntu® operating system). The RPCFF host may facilitate receiving, from the client computing device not configured to implement the proprietary remote procedure call protocol (e.g., Microsoft RPC), a request to communicate with the remote server configured to implement the proprietary remote procedure call protocol. The RPCFF host may facilitate providing, via a remote procedure call layer, network level authentication for the client computing device. The RPCFF host may provide a data path for a logical role on the remote server without implementing a server stack in the proprietary remote procedure call protocol. The logical role may be configured to implement the proprietary remote procedure call protocol. The RPCFF host may define a communication syntax, for the data path, between the client computing device and the logical role. The communication syntax may be different from the proprietary remote procedure call protocol. The communication syntax may involve translating between a universal communication protocol (e.g. Secure Shell) and the proprietary remote procedure call protocol. The RPCFF host may facilitate communicating data, according to the communication syntax, via the data path, between the client computing device and the logical role.

In one implementation, the subject technology relates to a remote gateway client proxy. The client proxy assists a service incompatible client computing device in communicating with a remote server computing device and machines in a service, including a network-based procedure call interface and a gateway interface.

Client-server computer systems are oftentimes implemented to allow users of client computing devices to access data stored on server computing devices that are located remote to the client computing devices. However, one disadvantage of client-server computer systems is that a particular client computing device might not be able to interface with a particular server computing device if the client computing device lacks an operating system that is associated with the server computing device. For example, a server computing device implementing a specialized operating system, such as Microsoft Windows Server 2008, may only be able to interact with client computing devices implementing certain Microsoft operating systems, such as Windows XP or Vista. Client computing devices implementing other operating systems, such as Google Android or Apple IOS operating systems, may not be able to fully interact with the server computing device. As the foregoing illustrates, what is needed in the art is a technique to allow a client computing device implementing an arbitrary operating system to fully interact with a server computing device implementing a specialized operating system.

Disadvantages of known client-server computing systems include that these systems rely heavily on proprietary protocols associated with the server computing device. For example, remote procedure call (RPC) is a Microsoft proprietary protocol. Only operating systems provisioned by Microsoft with RPC can use any Microsoft role, such as terminal services gateway (TSGW). This requires a very large footprint of code. Some of the shortcomings are that only Microsoft supplies the solution, the code size is large, and access through this mechanism is by design limited to Microsoft products.

In one aspect, the subject technology provides, among other things, a client-side solution that can interface Microsoft's Remote Desktop Gateway/Terminal Services Gateway (RDGW/TSGW) service, which implies that Microsoft's RPC are used. Therefore, in theory, it is not possible to interface a non-Microsoft client to Microsoft's TSGW since that non-Microsoft client doesn't have Microsoft's RPC capabilities. It is therefore the intrinsic nature of one aspect of the subject technology to "bridge" the RPC requirements without actually having an RPC software stack. This is accomplished by "hard coding" all input and output packets with data structures. Only data payloads change. Non-payload information remains constant. This is referred to in the industry as a "specialized packet filter."

In one approach, RPC is utilized to implement TSGW/RDGW service access. One alternative described herein would involve a specialized packet filter, or a Microsoft RPC clone.

In one aspect, advantages and benefits of the subject technology may include interfacing of RPC for tunneling of data through a firewall in a Microsoft environment with a non-Microsoft client. Furthermore, the ability to tunnel data by use of RPC without an RPC stack using a specialized packet filter is another objective. As a result, aspects of the subject technology can provide a clear competitive advantage that enables clients to access within corporate firewalls using standard Microsoft services or roles, or services or roles that traditionally have required the client computing device to have an operating system that is "compatible" with the server computing device.

First Example of Client-Server Computer System

FIG. 1 illustrates an example of a client-server computer system 100. As shown, the computer system 100 includes service compatible client 110, firewall 120, service 125, and remote server computing device 160. The service 125 includes binding interface 130, network-based procedure call interface 140, and gateway interface 150.

In one aspect, the service 125 is a Microsoft service, the network-based procedure call interface 140 is a remote procedure call (RPC) server, and the gateway interface 150 is a terminal services gateway (TSGW) or remote desktop gateway (RDGW) server. The service compatible client 110 may implement a Microsoft Windows operating system, such as XP or Vista.

The service compatible client 110 can be a laptop computer, a desktop computer, a tablet computer, a personal digital assistant (PDA), a mobile phone, or any similar device. The service compatible client 110 may implement an operating system compatible with service 125. As shown, the service compatible client 110 is connected with the binding interface 130 over the firewall 120, which may function to create or deny network connections based on a set of rules. In one aspect, the communication between the service compatible client 110 and the service 125 is implemented in RPC.

As shown, the binding interface 130 includes a memory 132. The memory 132 includes a binding in module 134 and a binding out module 136. The binding in module 134 and binding out module 136 may be implemented in all software, all hardware or a combination of software and hardware. As illustrated, the binding in module 134 receives input messages from the service compatible client 110 in a format associated with the network-based procedure call communications of the service 125 (e.g., RPC if the service 125 implements Microsoft Server) and transmits these input messages to the network-based procedure call interface 140. The binding out module 136 receives messages from the network-based procedure call interface 140 and provides these messages to the service compatible client 110. In one aspect, the service 125 is a Microsoft service, and the messages passing through the binding in module 134 and the binding out module 136 are in RPC.

In one aspect, the network-based procedure call interface 140 is an RPC server that implements an RPC protocol to allow commands in messages from the service compatible client 110 to be executed on the remote server computing device 160. In one aspect, the commands in the messages from the service compatible client 110 are bound to an address space of the remote server computing device 160 using the gateway interface 150. In one aspect, the gateway interface 150 implements Microsoft terminal services gateway (TSGW), Microsoft remote desktop gateway (RDGW) or a similar protocol that is associated with the operating system of the server computing device 160.

In one aspect, a tunnel 170 is created between the service compatible client 110 and the remote server computing device 160, facilitating communication between the service compatible client 110 and remote server computing device 160. In one aspect the tunnel 170 includes a channel 175 connecting the service compatible client 110 with the remote server computing device 160. In one aspect, there are multiple remote server computing devices 160 connected to a single service compatible client 110 using a single tunnel 170 and multiple channels 175.

Second Example of Client-Server Computer System

Figure 2:
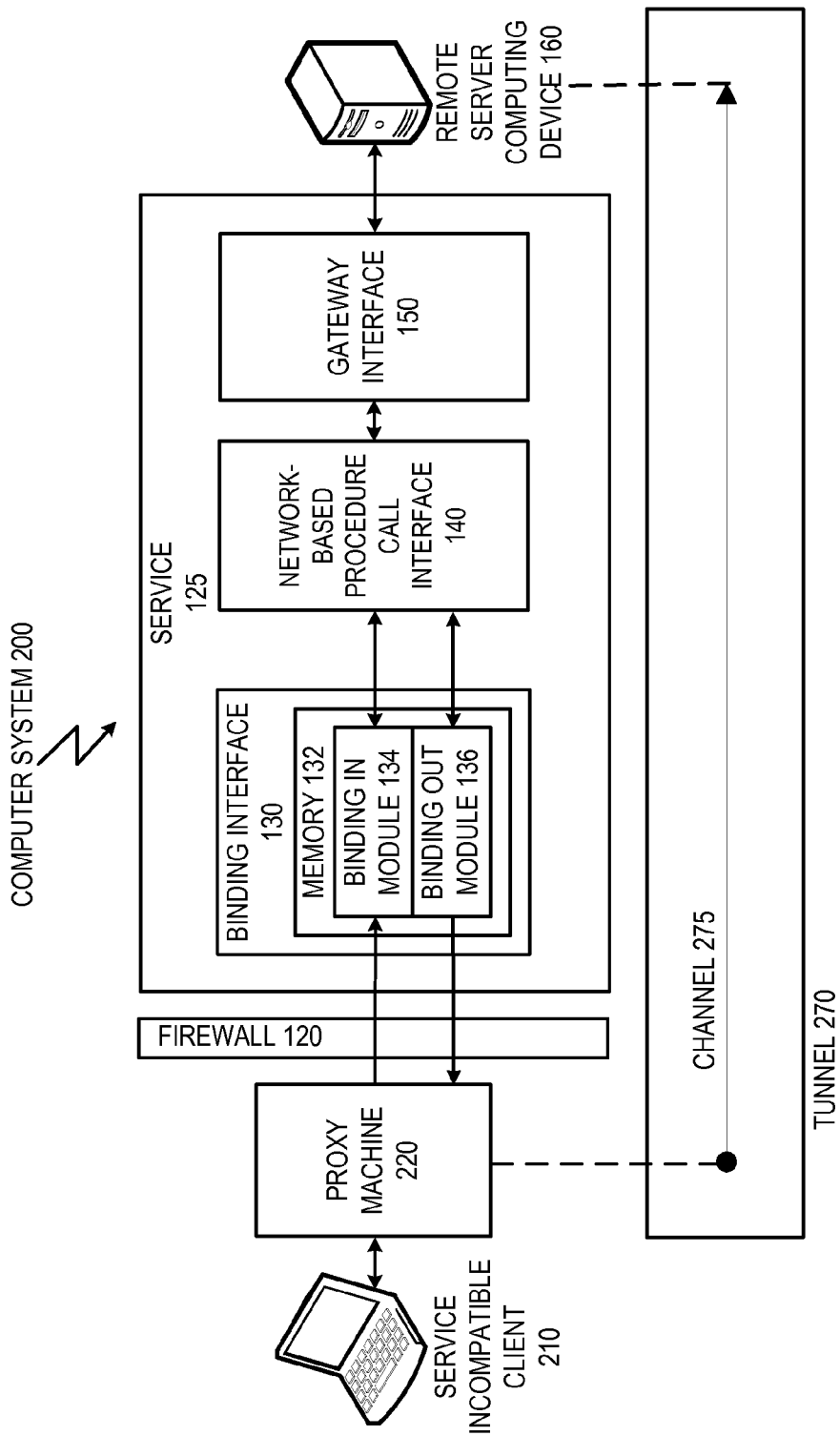
FIG. 2 illustrates an example of a client-server computer system with a service incompatible client in accordance with one aspect of the disclosure.

FIG. 2 illustrates an example of a client-server computer system 200 with a service incompatible client 210 in accordance with one aspect of the disclosure. As shown, the computer system 200 includes service incompatible client 210, proxy machine 220, firewall 120, service 125, and remote server computing device 160. The service 125 includes binding interface 130, network-based procedure call interface 140, and gateway interface 150.

In one aspect, the service 125 is a Microsoft service, the network-based procedure call interface 140 is a remote procedure call (RPC) server, and the gateway interface 150 is a terminal services gateway (TSGW) or remote desktop gateway (RDGW) server. The service incompatible client 110 may implement a non-Microsoft operating system, such as Apple IOS or Google Android.

The gateway interface 150 may provide a role service that allows authorized remote client computing devices to connect to network resources on an internal corporate or private network. The network resources can be servers or computers with a remote desktop protocol (e.g., Microsoft Remote Desktop Protocol®) enabled.

The gateway interface 150 may use Remote Desktop Protocol (RDP) over HTTPS to establish a secure, encrypted connection between the remote client computing devices and the internal network resources which the remote client computing devices attempt to access.

The gateway interface 150 may provide a client computing device with access to all network resources. Alternatively, the gateway interface 150 may provide a client computing device with access to only one or more network resources that the client computing device attempts to access, for example, via a point-to-point RDP connection.

In one aspect, a remote procedure call may be an inter-process communication that allows a computer program to cause a subroutine or procedure to execute in another address space (commonly on another computer on a shared network) without the programmer explicitly coding the details for this remote interaction. For example, a client computing device may cause a subroutine or procedure to execute in the address space of the server. In one implementation, the programmer may write essentially the same code whether the subroutine is local to the executing program, or remote. In one example, remote procedure call may include remote invocation or remote method invocation.

In one example implementation, a remote procedure call may be initiated by the client, which may send a request message to a known remote server to execute a specified procedure with supplied parameters. The remote server may send a response to the client, and the application continues its process. In one example, the server may receive one remote procedure call at a time from the client. Alternatively, the client may send one or more asynchronous requests to the server, for example, one or more XHTTP calls.

One difference between remote procedure calls and local calls is that remote procedure calls may, in some cases, fail due to unpredictable network problems. In some implementations, callers of remote procedure calls may deal with such failures without knowing whether the remote procedure was actually invoked. In some example, remote procedure calls may be used in carefully written low-level subsystems.

In one aspect, a sequence of events during a remote procedure call may be as follows. However, other sequences of events during a remote procedure call may also be used in conjunction with the subject technology.

(1) The client may call the client stub. The call may be a local procedure call. Parameters may be pushed on to an OSI stack.

(2) The client stub may pack the parameters (e.g., using marshalling) into a message and make a system call to send the message.

(3) The client's local operating system may send the message from the client to the server.

(4) The local operating system on the server may pass the incoming packets to the server stub.

(5) Finally, the server stub may call the server procedure. The reply may follow, for example, the same steps in the reverse direction.

In one example, a stub may be a piece of code used for converting parameters passed during a remote procedure call.

A remote procedure call may, in one example, allow a client to remotely call procedures on a server. The client and server may use different address spaces, so conversion of parameters used in a function call may have to be performed to allow the values of parameters passed during the remote procedure call to be used, as pointers to the memory may point to different data on the client and on the server. The client and server may also use different data representations even for simple parameters (e.g., big-endian versus little-endian for integers). Stubs are used to perform the conversion of the parameters, so a remote procedure call from the client looks, to the server, like a local procedure call for the server, and vice versa.

In one implementation, stub libraries are installed on client and server side. A client stub is responsible for conversion of parameters used in a function call and deconversion of results passed from the server after execution of the function. A server skeleton, the stub on server side, is responsible for deconversion of parameters passed by the client and conversion of the results after the execution of the function.

Stub can be generated either manually or automatically.

Manually: In this approach, the remote procedure call implementer may provide a set of translation functions from which a programmer can construct stubs.

Automatically: An interface description language (IDL), may be used for defining the interface between client and server. For example, an interface definition has information to indicate whether, each argument is input, output or both—only input arguments may need to be copied from client to server and only output elements may need to be copied from server to client.

In one example, in a remote procedure call, the client and the server are connected via a network (e.g., the Internet, an intranet or a Virtual Private Network), via a remote desktop protocol connection (e.g., via Microsoft Remote Desktop Protocol®, via Citrix Independent Computing Architecture (ICA)®, or via VMWare VMView®), via a wired connection, or via a wireless connection. In one example, a network-based procedure call may be a remote procedure call transmitted from a client to a server via a network (e.g., the Internet). The client and the server may be connected via a network.

The service incompatible client 210 is coupled with a proxy machine 220, which communicates with the binding interface 130. The binding interface 130 may function to bind a proprietary (e.g., Microsoft®) client interface to the proprietary (e.g., Microsoft®) server interface. For example, the binding interface 130 may bind the Windows® client interface to a Microsoft® RPC interface. In a first aspect, the proxy machine 220 is a component of the service incompatible client 210. In a second aspect, the proxy machine 220 may be located outside the service incompatible client 210 on the same side of the firewall 120 as the service incompatible client 210, as illustrated. In a third aspect, the proxy machine 220 is located within the firewall 120. In a fourth aspect, the proxy machine 220 is a component of the service 125. In a fifth aspect, the proxy machine 220 is located on the same side of the firewall as the service 125 but is not a component of the service 125. Persons skilled in the art may realize that other locations of the proxy machine are possible and consistent with the subject technology.

The service incompatible client 210 can be a laptop computer, a desktop computer, a tablet computer, a personal digital assistant (PDA), a mobile phone, or any similar device. The service incompatible client 210 may implement an arbitrary operating system incompatible with service 125. For example, if service 125 implements Microsoft Server, the service incompatible client 210 may implement an Apple IOS or a Google Android operating system.

As shown, the service incompatible client 210 is connected with the proxy machine 220. In one aspect, the proxy machine 220 is internal to the service incompatible client 210 and the connection between proxy machine 220 and service incompatible client 210 is a hard wire or other internal connection. In another aspect, the proxy machine 220 is external to the service incompatible client 210 and a native Internet protocol (IP) connection is implemented between the service incompatible client 210 and the proxy machine 220. In one aspect, the service incompatible client 210 can only communicate using native IP communications and the proxy machine 220 handles the communications with the service 125 transparently to the service incompatible client 210. The proxy machine 220 is also connected with the binding interface 130. In one aspect, the service incompatible client 210 communicates with the proxy machine using a native IP communication technique or a similar universal format. However, the service 125 is designed to accept messages in the network-based procedure call communication format for the service 125 (e.g., RPC if the service 125 is running Microsoft Server). The proxy machine 220 converts messages from the universal format (e.g., native IP communication) to the network-based procedure call format of the service 125 (e.g., RPC) based on an encoding for the network-based procedure call format of the service 125. The operation of the proxy machine 220 is described in more detail in conjunction with FIGS. 3-4 below.

As shown, the binding interface 130 includes a memory 132. The memory 132 includes a binding in module 134 and a binding out module 136. The binding in module 134 and binding out module 136 may be implemented in all software, all hardware or a combination of software and hardware. As illustrated, the binding in module 134 receives input messages from the proxy machine 220 in a format associated with the network-based procedure call communication of the service 125 and transmits these input messages to the network-based procedure call interface 140. The binding out module 136 receives messages from the network-based procedure call interface 140 and provides these messages to the proxy machine 220. The proxy machine 220 then translates these messages into a universal format and provides them to the service incompatible client 210. In one aspect, the service 125 is a Microsoft service, and the messages passing through the binding in module 134 and the binding out module 136 are in RPC.

In one aspect, the proxy machine 220 uses a RPC-filter to setup the gateway interface 150. Once the gateway interface 150 is established or setup, the gateway interface 150 may also be used to communicate RPC commands, including OPNUM commands. In one aspect, the network-based procedure call interface 140 is an RPC server that implements an RPC protocol to allow commands in messages from the proxy machine 220 to be executed on the remote server computing device 160. In one aspect, the commands in the messages from the proxy machine 220 are bound to an address space of the remote server computing device 160. In one aspect, the gateway interface 150 implements Microsoft terminal services gateway (TSGW), Microsoft remote desktop gateway (RDGW) or a similar protocol that is associated with the operating system of the remote server computing device 160. If the gateway interface 150 implements TSGW, then the gateway interface 150 may exchange data using OPNUM, a specialized syntax described in the TSGW specification. The OPNUM operations occur via a specialized RPC packet filter. RPC messages may be bound to TSGW messages using data exchanging or another technique of modifying memory representations of data. The remote server computing device 160 may include a remote desktop protocol (RDP) server as the target host. The proxy machine 220 may include the functions of the RPC packet filter to allow the client to transmit data to the server. In one aspect, RPC messages use marshalling for data exchange in conjunction with interchange data language (IDL). RPC messages may be bound to TSGW messages using marshalling or another technique of modifying memory representations of data. The remote server computing device 160 may include a remote desktop protocol (RDP) server as the target host.

The gateway interface 150 may be any gateway interface. For example, the gateway interface 150 may include a common gateway interface, a web server gateway interface, or a simple common gateway interface. In one example, the gateway interface 150 may have two sides, a server side of the gateway interface 150 and a client side of the gateway interface 150. The server side of the gateway interface 150 may call the client side of the gateway interface 150, providing environment information plus a callback function (for the client side of the gateway interface 150 to use to convey headers to the server side of the gateway interface 150), and receiving content (e.g., from the remote server computing device 160) in return.

In one aspect, marshalling may refer to techniques for transforming the memory representation of an object to a data format suitable for storage or transmission. Marshalling may be used when data must be moved between different parts of a computer program or from one program or machine to another (e.g., from a client to a server or from a server to a client). In one implementation, marshalling may be similar to serialization and may be used to communicate to remote objects with an object, in this case a serialized object. Marshalling may, in some cases, simplifies complex communication, using custom/complex objects to communicate instead of primitives.

In one aspect, an RPC packet filter may be utilized by to a client (e.g., client 210) not having access to an RPC stack for creating RPC commands to transmit to the server. A client may provide information that the client plans to transmit to the proxy machine 220. The proxy machine 220 may combine the information that the client plans to transmit with a RPC header (e.g., in the session layer, layer 5, of the open systems interconnection model). As a result, a client that does not modify, or does not have the ability to modify, the RPC layer in the open systems interconnection (OSI) model can still be able to populate fields in RPC transmissions via operation of the proxy. Lower layers of the OSI model in the RPC packet filter may include pre-filled RPC header data. Upper layers of the OSI model in the RPC packet filter may include client data. The proxy machine 220 may include the functions of the RPC packet filter to allow the client to transmit data to the server.

The OSI model may be used to represent data communications and networking. In one aspect, the OSI model may include the following layers: (1) physical layer, (2) data link layer, (3) network layer, (4) transport layer, (5) session layer, (6) presentation layer, and (7) application layer.

The physical layer (layer 1) may be responsible for the specifications of the transmission media (e.g., cable, wire, or wireless radio) and the electrical signal that goes into the transmission media. The physical layer may include one or more of the following functions: (a) providing the electrical and physical interface to the network, (b) specifying the type of medium, or (c) specifying how signals are transmitted within the medium. Example physical layer protocols include IEEE 802.11, IEEE 802.15, Bluetooth®, and universal serial bus (USB).

The data link layer (layer 2) may create the entity (the packet or frame) which is put on the transmission media. The data link layer may include one or more of the following functions: (a) controlling access to the communication channels, (b) controlling the flow of data within the communication channels, (c) organizing the data into logical frames, (d) identifying specific computers on the network, or (e) detecting communication errors. Example data link layer protocols include Frame Relay and Network Switch.

The network layer (layer 3) may be responsible for getting information to the correct computer or the correct network. The network layer may include one or more of the following functions: (a) moving information to the correct address, (b) assembling and disassembling packets or frames, (c) determining addressing and routing, or (d) determining the best path. Example network layer protocols include Internet Protocol (IP) and AppleTalk.

The transport layer (layer 4) may be responsible for providing extra connection services including error correction. The transport layer may include one or more of the following functions: (a) controlling data flow, e.g., slowing down transmissions if buffers are about to overflow, (b) fragmenting and reassembling data, (c) acknowledging successful transmissions, or (d) correcting faulty transmissions. Example transport layer protocols include transmission control protocol (TCP) and user datagram protocol (UDP).

The session layer (layer 5) may be responsible for controlling the setup, termination, and other mechanisms of a session. In one example, a session may include an agreement to communicate between two entities (e.g., modules or machines). The session layer may include one or more of the following functions: (a) establishing and maintaining connections, (b) dealing with name recognition, (c) dealing with synchronization of data transmissions by placing checkpoints within the data stream so that, if interrupted, the transmission can take up where it left off, or (d) handling remote procedure calls, e.g., running a program on a remote computer. Example session layer protocols include RPC, Network Basic Input/Output System (NetBIOS), Session Announcement Protocol (SAP), Point-to-Point Tunneling Protocol (PPTP), and Socket Secure (SOCKS).

The presentation layer (layer 6) may be responsible for providing syntax and grammatical rules for presenting data to the application layer (layer 7), including encoding, decoding, and otherwise converting data. The presentation layer may include one or more of the following functions: (a) maintaining representation of character sets (e.g., American Standard Code for Information Interchange (ASCII) or Unicode), (b) compressing or decompressing of data, e.g., for a communication protocol of the data link layer, (c) encrypting or decrypting of data, e.g., via one or more of the Data Encryption Standard (DES), RSA, or Secure Socket Layer (SSL) protocols, (d) implementing bit order translation, (e) implementing byte order translation, or (f) maintaining file structure. Example presentation layer protocols include SSL, Transport Layer Security (TLS), External Data Representation (XDR), or Multipurpose Internet Mail Extension (MIME).

The application layer (layer 7) may be responsible for providing network services to computing devices (e.g., clients or servers) and applications running on computing devices. The application layer may provide one or more of the following functions: (a) providing an interface between an operating system of a computing device and a network or communication path, or (b) providing network services such as file transfer, mail services, or terminal emulation. Example application layer protocols include Hypertext Transfer Protocol (HTTP), Secure Shell (SSH), File Transfer Protocol (FTP), Session Initiation Protocol (SIP), Network Time Protocol (NTP), Real-Time Transport Protocol (RTP), BitTorrent Protocol, and SPDY.

In one aspect, a tunnel 270 is created between the proxy machine 220 and the remote desktop computing device 160, facilitating communication between the proxy machine 220 and the remote desktop computing device 160. In one aspect the tunnel 270 includes a channel 275 connecting the proxy machine 220 with the remote server computing device 160. In one aspect, there are multiple remote server computing devices 160 connected to a single proxy machine 220 using a single tunnel 270 and multiple channels 275.

In one aspect, the proxy machine 220 of the subject technology may include the following elements:

(1) NLA (network layer authentication) referred to as "credssp" comprising NTLM/Kerberos (NT LAN Manager/Kerberos).

(2) HTTPS/SSL (hypertext transfer protocol secure/secure socket layer)—encryption based security.

(3) RPC Authentication—provides NLA at RPC layer.

(4) RPC Bridge/Filter—This provides stack elevation and demotion without RPC.

(5) Tunnel Creation—by use of the RPC bridge/filter.

(6) Channel Creation—by use of the RPC bridge/filter.

(7) Data Exchange—by use of the RPC bridge/filter.

In one aspect, stack elevation and demotion may refer to using a higher layer in the OSI model to traffic lower layer data, for example, via a tunnel (e.g., tunnel 170 or tunnel 270). Two modules (e.g., the proxy machine 220 and the remote server computing device 160) separated by a firewall (e.g., firewall 120) may use a communication protocol for a higher layer in the OSI model to traffic data associated with a lower layer in the OSI model. For example, Internet Protocol (IP) data (associated with the network layer, layer 3) may be trafficked via Hypertext Transfer Protocol (HTTP, associated with the application layer, layer 7) transmission techniques.

In some implementations of the OSI stack model, lower number layer data may not be transmitted over higher number layer protocols. Thus, stack elevation and demotion may provide a contradiction to the OSI stack to the degree that lower layer data may be transmitted via a higher layer protocol. As a result of stack elevation and demotion, the OSI layer stack may represent a bidirectional stream of data, rather than a unidirectional stream of data, as in some other implementations.

Under typical operation of the OSI model (without stack elevation and demotion), lower number layers have access to higher number layers, but higher number layers do not have access to lower number layers. For example, under typical operation of the OSI model, the physical layer (layer 1) may know which data link layer (layer 2) protocols are implemented, but not vice versa. Under stack elevation and demotion, the data link layer (layer 2) may know which physical layer (layer 1) protocols are being implemented, and vice versa. As a result, the OSI layer stack may represent a bidirectional stream of data, rather than a unidirectional stream of data (from low number layers to high number layers only).

Furthermore, if m and n represent layer numbers of the OSI model stack, where m<n, under stack elevation and demotion, data blocks of layer number m (lower number layer) may be trafficked via a layer number n (higher number layer) protocol. The data blocks for each layer is represented as demonstrated in Table 1-1.

TABLE 1-1

| Layer | Blocks in data |
| --- | --- |
| Layer 7, typical implementation | [Data Payload] |
| Layer 6, typical implementation | [Layer 7 Protocol ID] |
| | [Data Payload] |
| Layer 5, typical implementation | [Layer 6 Protocol ID] |
| | [Layer 7 Protocol ID] |
| | [Data Payload] |
| Layer 4, typical implementation | [Layer 5 Protocol ID] |
| | [Layer 6 Protocol ID] |
| | [Layer 7 Protocol ID] |
| | [Data Payload] |
| Layer 3, typical implementation | [Layer 4 Protocol ID] |
| | [Layer 5 Protocol ID] |
| | [Layer 6 Protocol ID] |
| | [Layer 7 Protocol ID] |
| | [Data Payload] |
| Layer 2, typical implementation | [Layer 3 Protocol ID] |
| | [Layer 4 Protocol ID] |
| | [Layer 5 Protocol ID] |
| | [Layer 6 Protocol ID] |
| | [Layer 7 Protocol ID] |
| | [Data Payload] |
| Layer 1, typical implementation | [Layer 2 Protocol ID] |
| | [Layer 3 Protocol ID] |
| | [Layer 4 Protocol ID] |
| | [Layer 5 Protocol ID] |
| | [Layer 6 Protocol ID] |
| | [Layer 7 Protocol ID] |
| | [Data Payload] |

One example of the data blocks for a layer with stack elevation and demotion are demonstrated in Table 1-2.

| Layer 7, with stack elevation and demotion from Layer 3 to layer 7 | [Layer 4 Protocol ID] [Layer 5 Protocol ID] [Layer 6 Protocol ID] [Layer 7 Protocol ID] [Data Payload] |
|---|---|

As illustrated in Tables 1-1 and 1-2, while in a typical implementation a protocol at layer n includes protocol IDs for layers n+1 to 7, with stack elevation and demotion from layer m to layer n, where m<n, data for layer n includes protocol IDs for layers m+1 to 7.

In one aspect of the subject technology, NLA may authenticate the user for access to the TSGW server; HTTPS/SSL may be used as the fundamental transport protocol; and RPC authentication may be a component of the RPC filter. According to one aspect, it is required to assure that a given user has permission to access the RPC layer; RPC Bridge may be the method of providing a data-path to the logical role/service known as TSGW. Tunnel Creation is one example of a command set to TSGW using RPC that creates an "hole" through a firewall. Channel Creation is one example of a command set to TSGW using RPC that creates a logical "channel" to a target host. According to one aspect, it is the channel by which data is transferred to and from a target host within a firewall. Data Exchange may be the process of using a Channel for sending or receiving data through a TSGW server.

In one example, a tunneling protocol (e.g., the tunneling protocol of tunnel 270 and channel 275) may be used when one network protocol (the delivery protocol) encapsulates a different payload protocol. By using tunneling, the computer system 200 can, for example, carry a payload over an incompatible delivery-network, or provide a secure path through an untrusted network.

In one example, tunneling may contrast with a layered protocol model such as those of OSI or TCP/IP. The delivery protocol may, in some cases, operate at a higher level in the model (e.g., OSI model) than does the payload protocol, or at the same level.

Tunneling protocols may use data encryption to transport insecure payload protocols over a public network (such as the Internet), thereby providing, e.g., virtual private network (VPN) functionality. For example, the IPsec protocol includes an end-to-end transport mode, but can also operate in a tunneling mode through a trusted security gateway.

In one example, a secure shell (SSH) tunnel may include an encrypted tunnel created through a SSH protocol connection. A SSH tunnel may be used to transfer unencrypted traffic over a network through an encrypted channel. For example, Microsoft Windows® machines can share files using the Server Message Block (SMB) protocol, a non-encrypted protocol. In one example, in a Microsoft Windows® file-system mounted remotely through the Internet, an eavesdropper snooping on the connection could see transferred files. However, to mount the Windows® file-system securely, a SSH tunnel that routes all SMB traffic to the remote fileserver through an encrypted channel may be established. Even though the SMB protocol itself may contain no encryption, the encrypted SSH channel through which the SMB protocol data travels may offer security.

In one example, a SSH tunnel may be set up by configuring a SSH client to forward a specified local port to a port on the remote machine. Once the SSH tunnel has been established, the SSH client can connect to the specified local port to access the network service. The local port need not have the same port number as the remote port.

SSH tunnels may provide a means to bypass firewalls that prohibit certain Internet services—so long as a site allows outgoing connections. For example, an organization may prohibit a user from accessing Internet web pages (port 80) directly without passing through the organization's proxy filter (which provides the organization with a means of monitoring and controlling what the user sees through the web). But users may not wish to have their web traffic monitored or blocked by the organization's proxy filter. If users can connect to an external SSH server, they can create a SSH tunnel to forward a given port on their local machine to port 80 on a remote web-server.

Some example SSH clients support dynamic port forwarding that allows creation of a SOCKS 4/5 proxy. As a result, applications can be configured to use a local SOCKS proxy server, giving applications more flexibility than creating a SSH tunnel to a single port. SOCKS can free a client from the limitations of connecting only to a predefined remote port and server. If an application does not support SOCKS, one can use a "socksifier" to redirect the application to the local SOCKS proxy server.

In one example, tunneling may be used to "sneak through" a firewall, using a protocol that the firewall would normally block, but is "wrapped" inside a protocol that the firewall does not block, such as hypertext transfer protocol (HTTP). If the firewall policy does not specifically exclude this kind of "wrapping," such wrapping can function to get around the intended firewall policy.

Another example HTTP-based tunneling method uses the HTTP CONNECT approach. A client may issue the HTTP CONNECT command to a HTTP proxy. The proxy then makes a TCP connection to a particular server port, and relays data between that server port and the client connection. As HTTP CONNECT may create a security hole, CONNECT-capable HTTP proxies may restrict access to the CONNECT approach. The proxy may, in one example, allow access only to a white list of specific authorized servers.

Example of Proxy Machine

Figure 3:
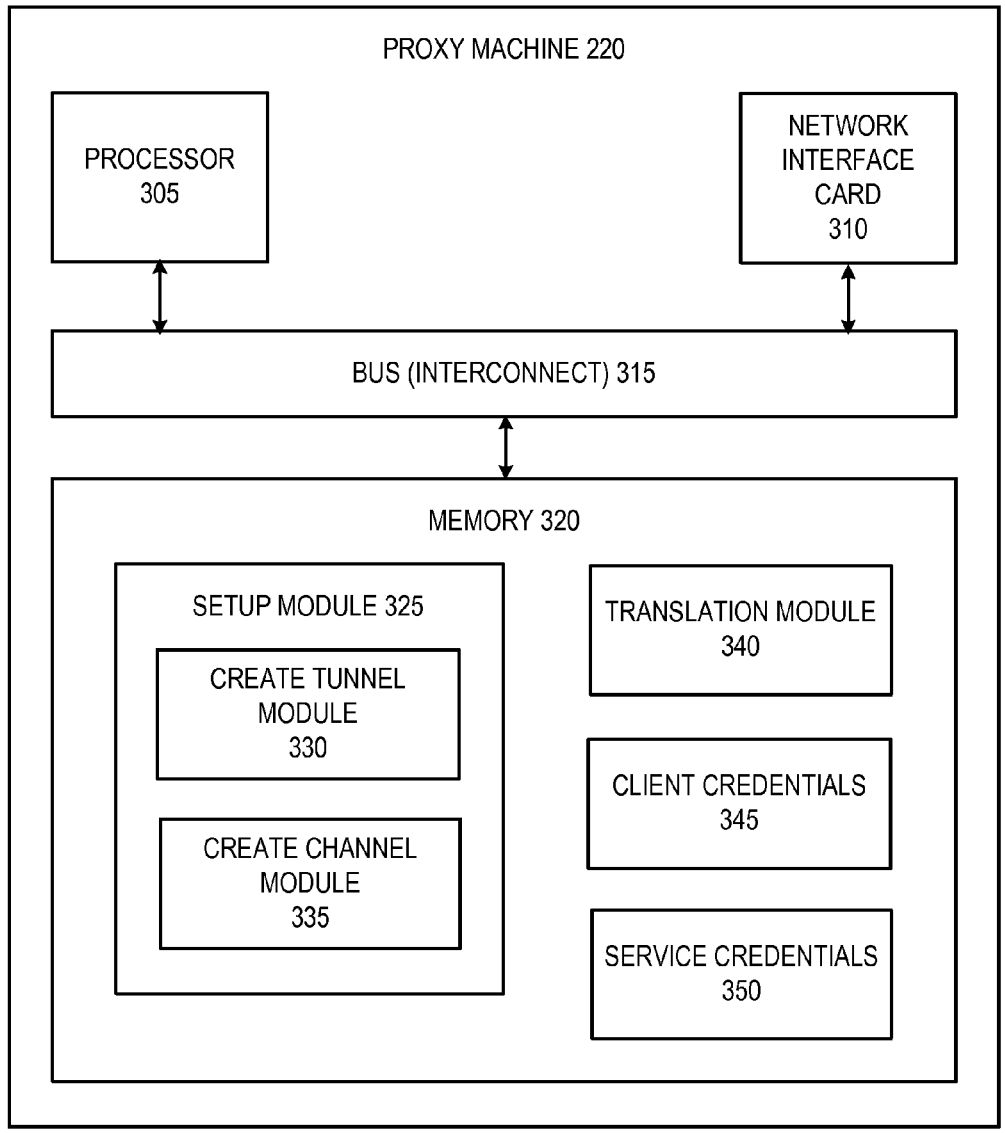
FIG. 3 illustrates an example of a proxy machine in accordance with one aspect of the disclosure.

FIG. 3 illustrates an example of a proxy machine 220 in accordance with one aspect of the disclosure. As shown, the proxy machine 220 includes a processor 305, a network interface card 310, and a memory 320 connected by a bus or interconnect 315.

The processor 305 functions to execute instructions that are provided to the processor 305 from the memory 320 or other storage locations. The network interface card 310 allows the proxy machine 220 to connect to a network, such as the Internet, a cellular network, a local area network (LAN) or an intranet. The memory 320 stores data and instructions that can be implemented or modified by the processor 305.

As shown, the memory 320 includes a setup module 325, a translation module 340, client credentials 345, and service credentials 350. The setup module 325 is configured to initiate the communication between the service incompatible client 210, the proxy machine 220, and the service 225. As illustrated, the setup module 325 includes a create tunnel module 330 and a create channel module 335.

The create tunnel module 330 facilitates the creation of the tunnel 270 between the proxy machine 220 and the service 125. The create channel module facilitates the creation of channel 275 within the tunnel 270. While only one channel 275 is illustrated, in one aspect, multiple channels 275 may be created. In one aspect, channel 275 connects the proxy machine 220 with the remote server computing device 160. The operation of the setup module is described in more detail in conjunction with FIG. 7, below.

The translation module 340 facilitates the translation of messages between the universal format for communication with the service incompatible client 210 and the network-based procedure call format of the service 125 (e.g. RPC). In one embodiment, the network-based procedure call format of the service is RPC and RPC encodings of commands and data are stored with the translation module 340 to allow the translation module to convert messages between the universal format and RPC.

As shown, the memory 320 further includes client credentials 345 and service credentials 350. In one aspect, the client credentials 345 include a username, a password, a domain name, and a host name. In one aspect, the service credentials 350 include valid usernames of users of the service, valid passwords associated with the usernames, a domain name, and a host name.

The proxy machine 220 and/or a module for setting up the proxy machine 220 may reside within (e.g., embedded in) a router for establishing a port forward or a virtual private network (VPN) through a gateway service (e.g., a TSGW service or service 125). In some implementations, RPC code may not be available on client devices running non-proprietary (e.g., non-Microsoft) operating systems operating without a proxy machine or running RPC, or such clients may require a large amount of code. Hence, in one aspect, having a proxy machine embedded in a router for establishing a VPN or port forward through a gateway service is currently not possible due to the amount of code required and the fact that the RPC code is not available on non-proprietary (e.g., non-Microsoft) operating systems. It should be noted that TSGW is one example of a gateway protocol. Any other gateway protocol (e.g., a proprietary gateway protocol) may be used in conjunction with the subject technology. Also, in some aspects, the subject technology may include any modification, augmentation, or omission to the RPC layer.

Example of Translation Module

Figure 4:
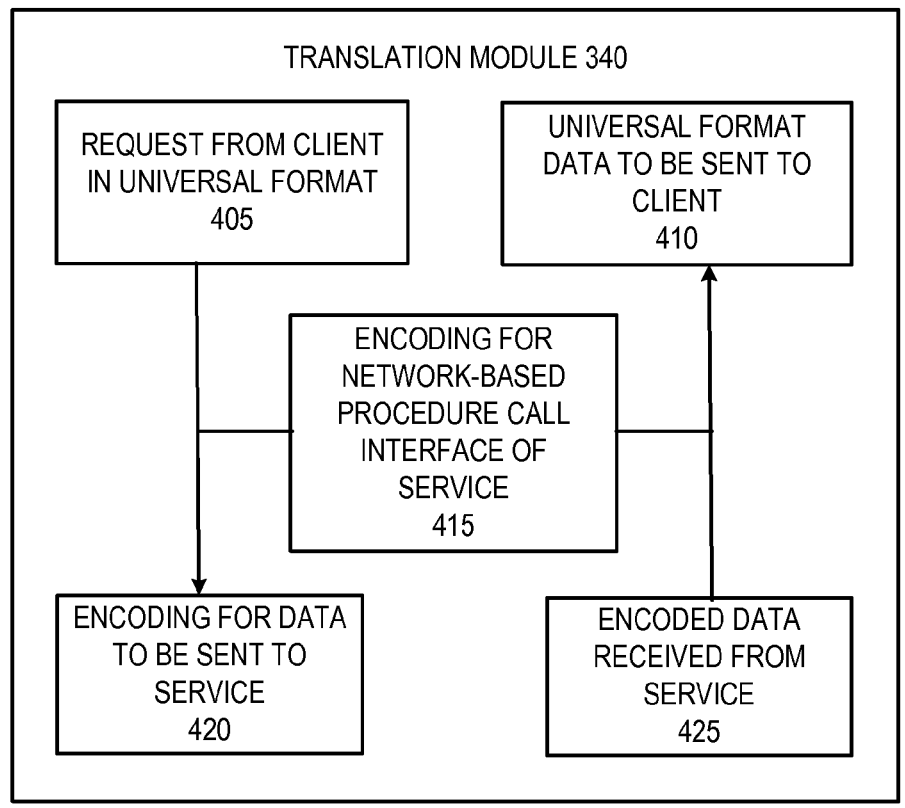
FIG. 4 illustrates an example of a translation module in accordance with one aspect of the disclosure.

FIG. 4 illustrates an example of a translation module 340 in accordance with one aspect of the disclosure.

As shown, the translation module 325 includes a request 405 from a client in a universal format, universal format data 410 to be sent to the client, encoding 415 for the network-based procedure call interface of the service 125, encoding 420 for data to be sent to the service, and encoded data 425 received from the service. In one aspect, the network-based procedure call interface of the service 125 is in RPC.

In one aspect, the translation module 340 receives a request 405 from the service incompatible client 210 in a universal format. The translation module 340 uses the encoding 415 for the network-based procedure call interface of the service to encode the request 405 in the network-based procedure call communication format, resulting in an encoding 420 for data to be sent to the service 125. In one aspect, the translation module 340 then facilitates sending this encoding 420 to the service 125.

In one aspect, the translation module 340 receives encoded data 425 from the service 125. The translation module 340 then decodes the encoded data 425 from the service 125 based on the encoding 415 for the network-based procedure call interface of the service 125. The result is universal format data 410 that can be sent to the service incompatible client 210. In one aspect, the translation module 340 then facilitates sending the universal format data 410 to the service incompatible client 210.

Example of Computing Device

Figure 5:
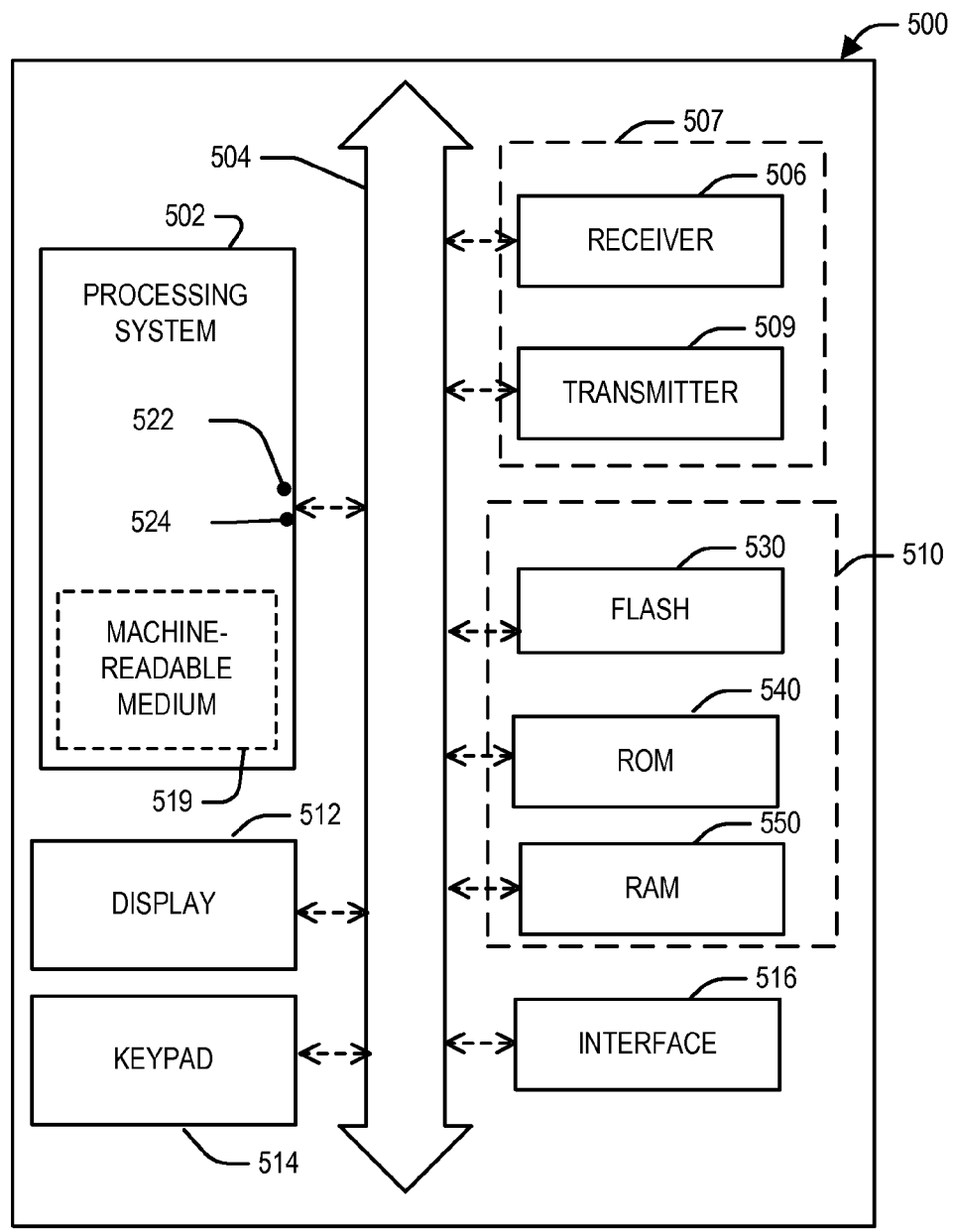
FIG. 5 is a conceptual block diagram illustrating an example of a computing device.

FIG. 5 is a conceptual block diagram illustrating an example of a computing device.

A computing device 500 may be, for example, a service compatible client 110, a service incompatible client 210, a proxy machine 220, a binding interface 130, a RPC server 140, a gateway interface 150 or a remote server computing device 160. A computing device may comprise one or more computing devices.

A computing device 500 may include a processing system 502. The processing system 502 is capable of communication with a receiver 506 and a transmitter 508 through a bus 504 or other structures or devices. It should be understood that communication means other than busses can be utilized with the disclosed configurations. The processing system 502 can generate commands, messages, and/or other types of data to be provided to the transmitter 509 for communication. In addition, commands, messages, and/or other types of data can be received at the receiver 506, and processed by the processing system 502.

The processing system 502 may operate in conjunction with a general-purpose processor or a specific-purpose processor for executing instructions and may further include a machine-readable medium 519 for storing data and/or instructions for software programs. The instructions, which may be stored in a machine-readable medium 510 and/or 519, are executable by the processing system 502 to control and manage access to the various networks, as well as provide other communication and processing functions. The instructions may also include instructions executable by the processing system 502 for various user interface devices, such as a display 512 and a keypad 514. The processing system 502 may include an input port 522 and an output port 524. Each of the input port 522 and the output port 524 may include one or more ports. The input port 522 and the output port 524 may be the same port (e.g., a bidirectional port) or may be different ports.

The processing system 502 may be implemented using software, hardware, or a combination of both. By way of example, the processing system 502 may be implemented with one or more processors. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, and/or any other suitable device that can perform calculations or other manipulations of information. Those skilled in the art will recognize how best to implement the described functionality for the processing system 502.

Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code). Instructions may be executable, for example, by a computing device (e.g., a client computing device, an HTTP server, a web server) or by a processing system (e.g., an operating system, an HTTP server, or a web server). Instructions can be, for example, a computer program including code.

A machine-readable medium can be one or more machine-readable media. A machine-readable medium (e.g., 510) may include storage external to an operating system, such as a random access memory (RAM) 550, a flash memory 530, a read only memory (ROM) 540, a programmable read-only memory (PROM), an erasable PROM (EPROM), registers, a hard disk, a removable disk, a CD-ROM, a DVD, or any other suitable storage device. A machine-readable medium 519 may also have a volatile memory and a non-volatile memory. The machine-readable medium 519 may be a non-transitory machine-readable medium. A non-transitory machine-readable medium may include one or more volatile and/or non-volatile memories. A machine-readable medium 519 may include storage integrated into a processing system, such as might be the case with an application specific integrated circuit (ASIC). A memory may be a machine-readable medium (e.g., 510 or 519) or a part thereof.

According to one aspect of the disclosure, a machine-readable medium is a computer-readable medium encoded or stored with instructions and is a computing element, which defines structural and functional interrelationships between the instructions and the rest of the computing device, which permit the instructions' functionality to be realized. In one aspect, a machine-readable medium is a non-transitory machine-readable medium, a machine-readable storage medium, or a non-transitory machine-readable storage medium. In one aspect, a machine-readable medium is a computer-readable medium, a non-transitory computer-readable medium, a computer-readable storage medium, or a non-transitory computer-readable storage medium.

An interface 516 may be any type of interface and may reside between any of the components shown in FIG. 5. An interface 516 may also be, for example, an interface to the outside world (e.g., an Internet network interface). A transceiver block 507 may represent one or more transceivers, and each transceiver may include a receiver 506 and a transmitter 509. A functionality implemented in a processing system 502 may be implemented in a portion of a receiver 506, a portion of a transmitter 509, a portion of a machine-readable medium 510, a portion of a display 512, a portion of a keypad 514, or a portion of an interface 516, and vice versa. In one aspect, a computing device may include only some or all of the elements shown in FIG. 5. A computing device may include other elements not shown in FIG. 5. A computing device may include more than one of the same elements.

Example of Network System

Figure 6:
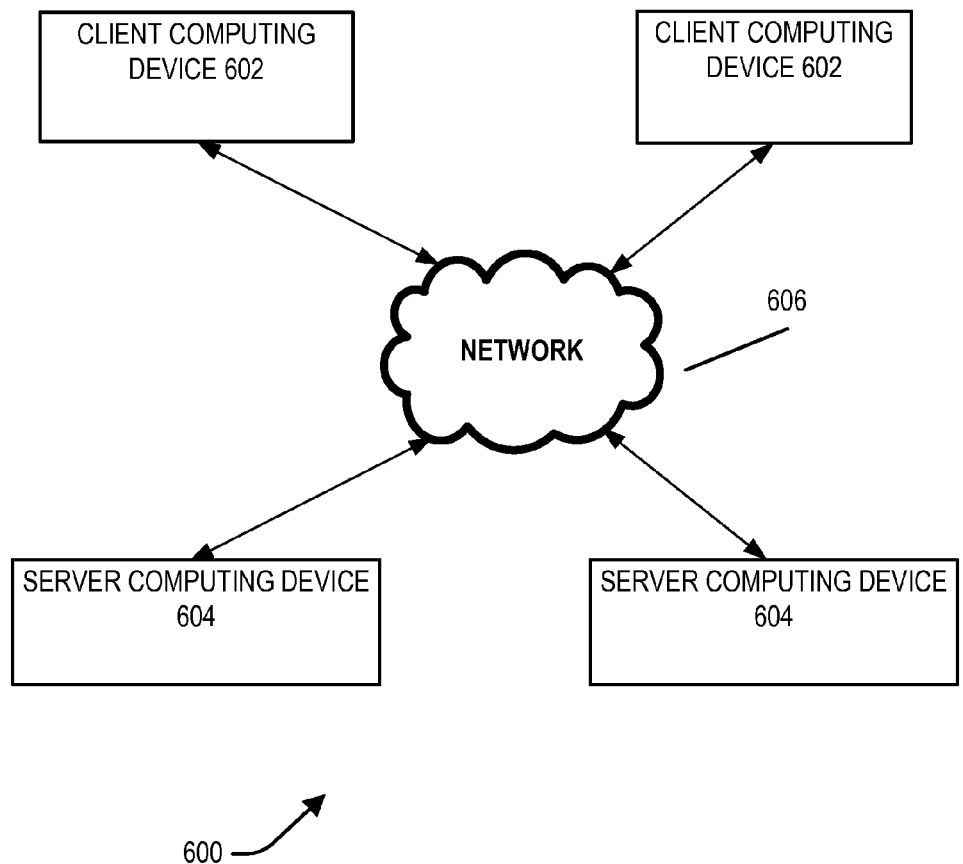
FIG. 6 illustrates a simplified diagram of an example of a network system.

FIG. 6 illustrates a simplified diagram of an example of a computer network system in accordance with an aspect of the present disclosure.

A computer network system 600 may include one or more client computing devices 602 (e.g., laptop computers, desktop computers, tablets, PDAs, mobile phones, etc.) in communication with one or more server computing devices 604 (e.g., a server such as an HTTP server, a web server, an enterprise server, etc.) via a network 606. In one aspect, a server computing device 604 is configured to allow remote sessions (e.g., remote desktop sessions) wherein users can access applications and files on the server computing device 604 by logging onto the server computing device 604 from a client computing device 602. Such a connection may be established using any of several well-known techniques such as the remote desktop protocol (RDP) on a Windows-based server or the techniques disclosed herein for a non-Windows-based server.

In one aspect of the disclosure, a client computing device 602 may be an end-user computing device, such as a laptop or desktop computer. In one aspect, a server computing device 604 may be a terminal services gateway (TSGW) server or a remote desktop gateway (RDGW) server.

By way of illustration and not limitation, a client computing device 602 can represent a computer, a mobile phone, a laptop computer, a tablet, a thin computing device, a personal digital assistant (PDA), a portable computing device, a virtual machine, or a suitable device with a processor. In one example, a client computing device 602 is a smart phone (e.g., iPhone, Android phone, Blackberry, etc.). In certain configurations, a client computing device 602 can represent an audio player, a game console, a camera, a camcorder, an audio device, a video device, a multimedia device, or a device capable of supporting a connection to a remote computing device. In an advantageous example, a client computing device 602 is mobile. In another advantageous example, a client computing device 602 is a hand-held device. In another example, a client computing device 602 can be stationary. In one example, a client computing device 602 may be a device having at least a processor and memory, where the total amount of memory of the client computing device 602 is less than the total amount of memory in a server computing device 604. In an advantageous example, a client computing device 602 does not have a hard disk. In one advantageous aspect, a client computing device 602 has a display smaller than a display supported by a server computing device 604.

In one aspect, a server computing device 604 may represent a computer, a laptop computer, a computing device, a virtual machine (e.g., VMware® Virtual Machine), a desktop session (e.g., Microsoft Terminal Server), a published application (e.g., Microsoft Terminal Server) or a suitable device with a processor. In one aspect, a server computing device 604 can be stationary. In another aspect, a server computing device 604 can be mobile. In certain configurations, a server computing device 604 may be any device that can represent a computing device. In one aspect, a server computing device 604 may include one or more computing devices.

In one example, a first device is remote to a second device when the first device is not directly connected to the second device. In one example, a first remote device may be connected to a second device over a communication network such as a Local Area Network (LAN), a Wide Area Network (WAN), and/or other network.

When a client computing device 602 and a server computing device 604 are remote with respect to each other, a client computing device 602 may connect to a server computing device 604 over a network 606, for example, via a modem connection, a LAN connection including the Ethernet or a broadband WAN connection including DSL, Cable, T1, T3, Fiber Optics, Wi-Fi, or a mobile network connection including GSM, GPRS, 3G, WiMax or other network connection. A network 606 can be a LAN network, a WAN network, a wireless network, the Internet, an intranet or other network. A remote device (e.g., a computing device) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. However, the subject technology is not limited to these examples.

Figure 7:
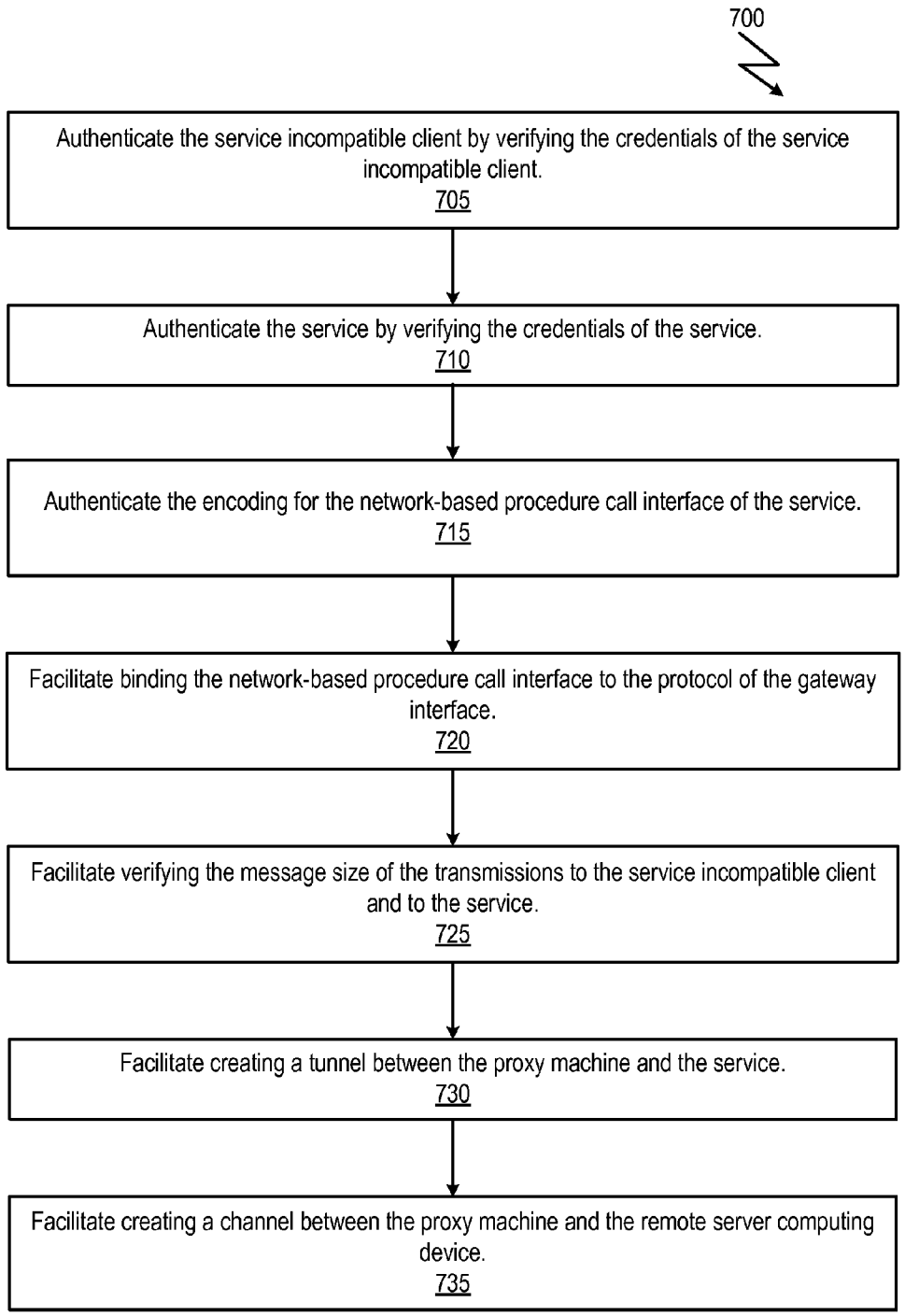
FIG. 7 illustrates an example of a process of facilitating creating a tunnel and channels between the proxy machine and the remote server computing device in accordance with one aspect of the disclosure.

Example of Process of Facilitating Creating Tunnel and Channels Between Proxy Machine and Service In accordance with one aspect of the disclosure, FIG. 7 illustrates an example of a process 700 of facilitating creating a tunnel 270 and channel 275 between the proxy machine 220 and the remote server computing device 160.

At process 705, the setup module 325 in the proxy machine 220 authenticates the service incompatible client 210. In one aspect, the authentication is accomplished by verifying the client credentials 345. The client credentials 345 may include a username, a password, a domain name, and a host name. Persons skilled in the art will recognize other techniques through which the setup module 325 could authenticate the service incompatible client 210.

At process 710, the setup module 325 in the proxy machine 220 authenticates the service. In one aspect, the authentication is accomplished by verifying the service credentials 350. The service credentials 350 may include valid usernames of users of the service, valid passwords associated with the usernames, a domain name, and a host name.

At process 715, the setup module 325 in the proxy machine 220 authenticates the encoding 415 for the network-based procedure call interface of the service 125 stored in association with the translation module 340 in the proxy machine 220. In one aspect, the service 125 implements Microsoft Server and the network-based procedure call interface of the service 125 is Microsoft RPC.

At process 720, the setup module 325 in the proxy machine 220 facilitates binding the network-based procedure call data of the service 125 to the protocol of the gateway interface 150. In one aspect, the protocol of the gateway server is TSGW or RDGW.

At process 725, the setup module 325 in the proxy machine 220 facilitates verifying the message size of the transmissions to the service incompatible client 210 and to the service 125. In one aspect, the messages to the service incompatible client are in a universal format. In one aspect, marshalling is used to ensure that messages from the proxy machine 220 to the service 125 are of the appropriate message size.

At process 730, the create tunnel module 330 in the setup module 325 in the proxy machine 220 facilitates creating a tunnel 270 between the proxy machine 220 and the remote server computing device 160. In one aspect, the tunnel 270 facilitates communication between the proxy machine 220 and the remote server computing device 160 using the network-based procedure call communication of the service 125.

At process 735, the create channel module 335 in the setup module 325 in the proxy machine 220 facilitates creating channel 275 between the proxy machine 220 and the remote sever computing device 160. In one aspect, there may be multiple remote server computing devices 160 and multiple channels 275 may be created.

Example of Process of Facilitating Communication Between Client and Service

Figure 8:
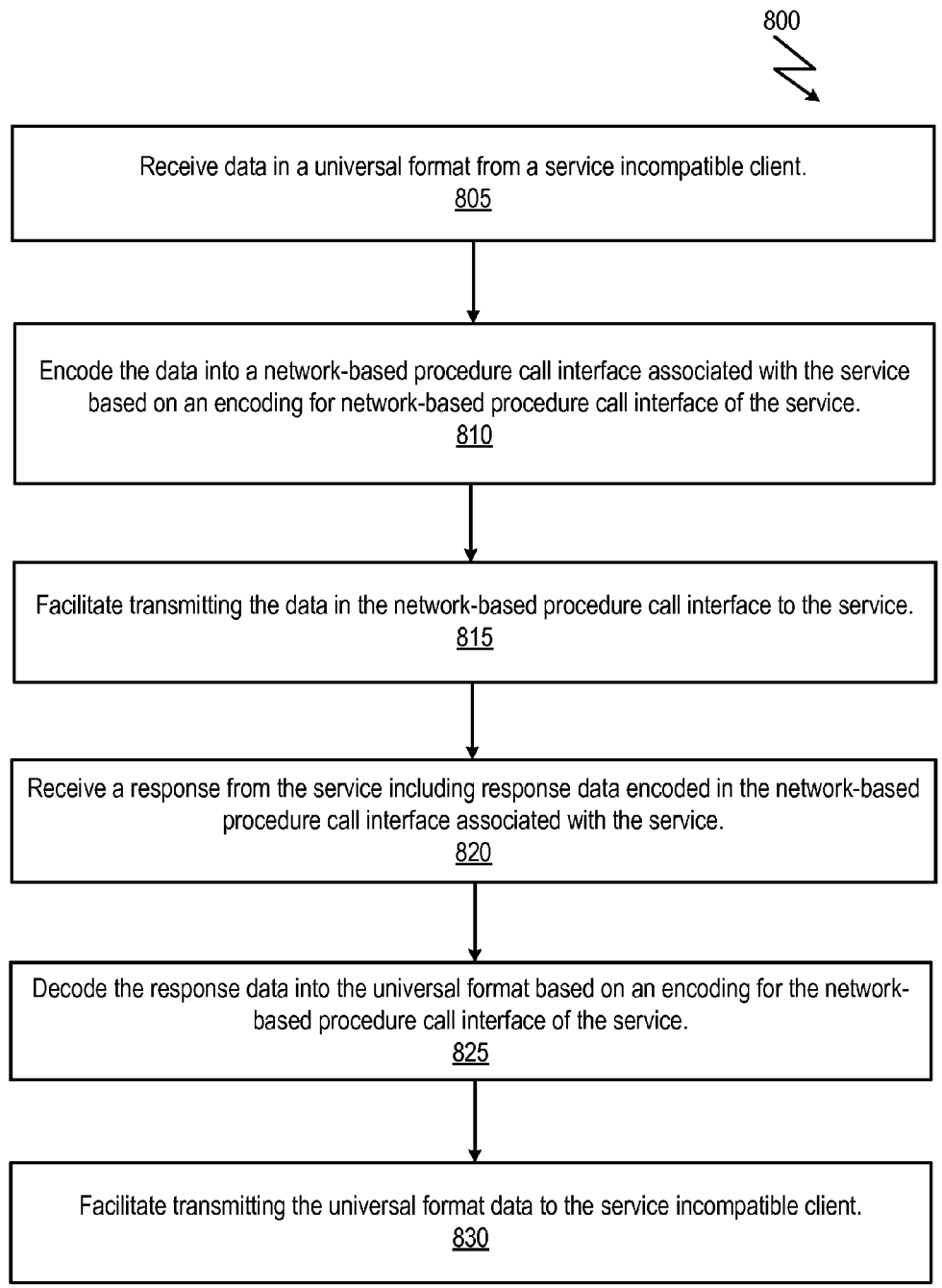
FIG. 8 illustrates an example of a process of facilitating communication between the service incompatible client and the remote server computing device in accordance with one aspect of the disclosure.

In accordance with one aspect of the disclosure, FIG. 8 illustrates an example of a process 800 of facilitating communication between the service incompatible client 210 and the remote server computing device 160.

At process 805, the translation module 340 in the proxy machine 220 receives data in a universal format from the service incompatible client 210. In one aspect, the data is a request 405 from the service incompatible client 210. In one aspect the request 405 is received by the proxy machine 220 over a native IP connection.

At process 810, the translation module 340 in the proxy machine 220 encodes the data into an network-based procedure call interface associated with the service 125 based on an encoding 415 for the network-based procedure call interface of the service 125. In one aspect, the result is an encoding of data 420 to be sent to the service. In one aspect, the format for the network-based procedure call communication of the service 125 is RPC an the encoding 415 includes a set of RPC commands and data. In one aspect, the encoding 415 includes a set of commands and data in the network-based procedure call interface of the service 125.

At process 815, the translation module 340 in the proxy machine 220 facilitates transmitting the data 420 into the network-based procedure call interface associated with the service 125. In one aspect, the data 420 is transmitted to the service 125 over the tunnel 270.

At process 820, the translation module 340 in the proxy machine 220 receives a response from the service including response data 425 encoded in the network-based procedure call interface associated with the service 125. In one aspect, the response data 425 is a response to the data 420 that was submitted to the service 125. In one aspect, the response data 425 is received over the tunnel 270.

At process 825, the translation module 340 in the proxy machine 220 decodes the response data into the universal format based on the encoding 415 for the network-based procedure call interface of the service. In one aspect, the result of the decoding is universal format data 410 to be sent to the service incompatible client 210.

At process 830, the translation module 340 in the proxy machine 220 facilitates transmitting the universal format data 410 to the service incompatible client 210. In one aspect, the universal format data 410 is transmitted to the service incompatible client 210 over a native IP connection.

In one example, a process of the subject technology is described as follows:
Setup (Inbound)
(1) NTLM Authentication through HTTP over SSL.
(2) NTLM Authentication through RPC over SSL over HTTP.
(3) HTTP to RPC Bindings.
Setup (Outbound)
(4) NTLM Authentication through HTTP over SSL.
(5) NTLM Authentication through RPC over SSL over HTTP.
(6) HTTP to RPC Bindings.
Setup (RPC)
(7) RPC to TSGW Bindings.
(8) RPC Marshal size (32 bit).
TSGW via RPC
(9) Operations 1-9 (OPNUM).

One function of the process outlined above may be the setup of an inbound web-service authenticated HTTPS pathway, and the setup of authenticated RPC inbound access. The process may also provide the setup of outbound web-service authenticated HTTPS pathway, and the setup of outbound authenticated RPC access. The process may also provide the setup of RPC binding to TSGW role and the setup of RPC marshalling data size (32 bit fields). The use of OPNUM can provide tunnel creation, tunnel authentication, channel creation, and channel binding. In one example, all OPNUM operations occur by use of a specialized RPC packet filter. These steps may be required to meet Microsoft's requirements for accessing TSGW role providing this service if the service 125 implements a Microsoft operating system such as Microsoft Server.

In one aspect, a unique HTTPS connection is created for inbound and outbound data. These are logically bound (by use of RPC protocol) to establish a single logical connection to RPC services. These are in turn bound to a TSGW using RPC protocol through a fixed filter mechanism. The result is the ability to exchange data using OPNUM. OPNUM are specialized syntax described by TSGW specification. In one aspect, these require RPC pathway from outside firewall to utilize. Once established, a Tunnel and Channel may be created for transporting of data from a client to a Target server, such as a RDP server. The result achieved may be a tunnel through the firewall 120 to Microsoft TSGW role with a channel (data path) from/to target host of the remote server computing device 160.

In one aspect, commands implementing various RPC commands such as OPNUM are received either by functional passing of parameters (when included within the service compatible client 110 or the proxy machine 220) or through protocol syntax. The subject technology can interface the features of the proxy machine 220 through commands by function or by protocol syntax.

Example of Remote Gateway Client Proxy

Figure 9:
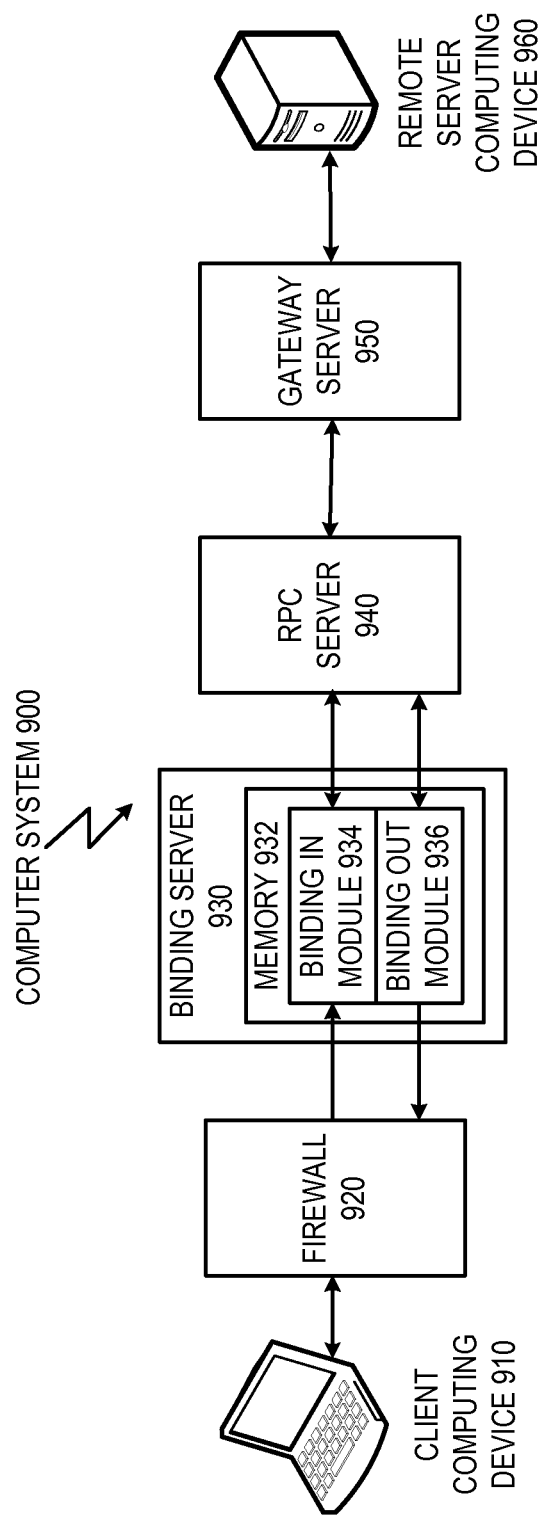
FIG. 9 illustrates an example of a client-server computer system in accordance with one aspect of the disclosure.

FIG. 9 illustrates an example of a client-server computer system 900. As shown, the computer system 900 includes client computing device 910, firewall 920, binding server 930, remote procedure call (RPC) server 940, gateway server 950, and remote server computing device 960.

The client computing device 910 can be a laptop computer, a desktop computer, a tablet computer, a personal digital assistant (PDA), a mobile phone, or any similar device. The client computing device may implement a substantially arbitrary operating system having hypertext transfer protocol secure (HTTPS) communication capabilities. As shown, the client computing device 910 is connected with the binding server 930 over the firewall 920, which may function to create or deny network connections based on a set of rules. In one aspect, a unique HTTPS connection is created for inbound data (directed to the remote server computing device 960) and outbound data (directed to the client computing device 910).

As shown, the binding server 930 includes a memory 932. The memory 932 includes a binding in module 934 and a binding out module 936. The binding in module 934 and binding out module 936 may be implemented in all software, all hardware or a combination of software and hardware. As illustrated, the binding in module 934 receives input messages from the client computing device 910 in a format associated with the client computing device, such as HTTPS, and translates the messages into a format that is associated with the remote server computing device 960, such as a format specific to the operating system of the remote server computing device 960. The binding out module 936 receives input messages from the server computing device 960 and translates the messages into a format that is associated with the client computing device 910.

As illustrated, the output from the binding out module 936 is transmitted to the RPC server 940. The input to the binding in module 934 is transmitted from the RPC server 940. In one aspect, the RPC server 940 implements an RPC protocol to allow commands in messages from the client computing device 910 to be executed on the remote server computing device 960. In one aspect, the commands in the messages from the client computing device 910 are bound to an address space of the remote server computing device 960 using the gateway server 950. In one aspect, the gateway server 950 implements Microsoft terminal services gateway (TSGW), Microsoft remote desktop gateway (RDGW) or a similar protocol that is associated with the operating system of the server computing device 960. If the gateway server 950 implements TSGW, then the gateway server 950 may exchange data using OPNUM, a specialized syntax described in the TSGW specification. In the OPNUM implementation, a tunnel and channel system may be created for transporting data from the client computing device 910 to the remote server computing device 960. The OPNUM operations occur via a specialized RPC packet filter. RPC messages may be bound to TSGW messages using marshalling or another technique of modifying memory representations of data. The remote server computing device 960 may include a remote desktop protocol (RDP) server as the target host.

To summarize, according to one aspect, the communication between the client computing device 910 and the binding server 930 over the firewall 920 is implemented in an authenticated HTTPS pathway that is independent of any operating system. The communication between the binding server 930 and the RPC server 940 is implemented using the RPC protocol. The communication between the RPC server 940 and the gateway server 950 is in RPC or a remote server computing device 960 operating system specific protocol, such as OPNUM if the gateway server 950 implements Microsoft TSGW.

In one aspect, the subject technology may include the following elements:

(1) NLA (network layer authentication) referred to as "credssp" comprising NTLM/Kerberos (NT LAN Manager/ Kerberos).

(2) HTTPS/SSL (hypertext transfer protocol secure/secure socket layer)—encryption based security.

(3) RPC Authentication—provides NLA at RPC layer.

(4) RPC Bridge/Filter—This provides stack elevation and demotion without RPC.

(5) Tunnel Creation—by use of the RPC bridge/filter.

(6) Channel Creation—by use of the RPC bridge/filter.

(7) Data Exchange—by use of the RPC bridge/filter.

In one aspect of the subject technology, NLA may authenticate the user for access to the TSGW server; HTTPS/SSL may be used as the fundamental transport protocol; and RPC authentication may be a component of the RPC filter. According to one aspect, it is required to assure that a given user has permission to access the RPC layer; RPC Bridge may be the method of providing a data-path to the logical role/service known as TSGW. Tunnel Creation is one example of a command set to TSGW using RPC that creates an "hole" through a firewall. Channel Creation is one example of a command set to TSGW using RPC that creates a logical "channel" to a target host. According to one aspect, it is the channel by which data is transferred to and from a target host within a firewall. Data Exchange may be the process of using a Channel for sending or receiving data through a TSGW server.

Figure 10:
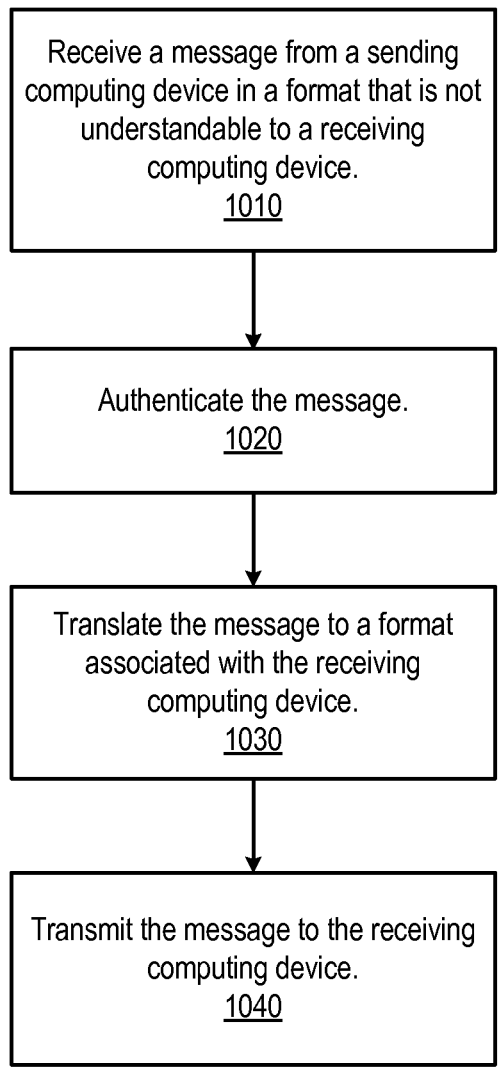
FIG. 10 illustrates an example of a process of translating a message from a format associated with a sending computing device to a format associated with the receiving computing device in accordance with one aspect of the disclosure.

In accordance with one aspect of the disclosure, FIG. 10 illustrates an example of a process of translating a message from a format associated with a sending computing device to a format understandable to a receiving computing device.

As is understood, the format associated with the sending computing device may be HTTPS, and the format understandable to the receiving computing device may be RPC. Alternatively, the format associated with the sending computing device may be RPC, and the format understandable to the receiving computing device may be HTTPS.

At process 1010, the binding out module 936 receives a message from a sending computing device, such as remote server computing device 960, in a format that is not understandable to a receiving computing device, such as RPC. At process 1020, the binding out module 936 authenticates the message as being from the remote server computing device 960 and directed to the client computing device 910.

At process 1030, the binding out module 936 translates the message to a format understandable to the receiving client computing device 910, such as HTTPS. In one aspect, marshalling is implemented to bring about the translation. At process 1040, the binding out module 936 transmits the message to the receiving client computing device 910.

In an alternative aspect, the binding in module receives a message from the sending client computing device 910 in HTTPS or a similar format and translated the message to a format understandable to the receiving server computing device 960, such as RPC, using a procedure similar to the one described above.

Figure 11:
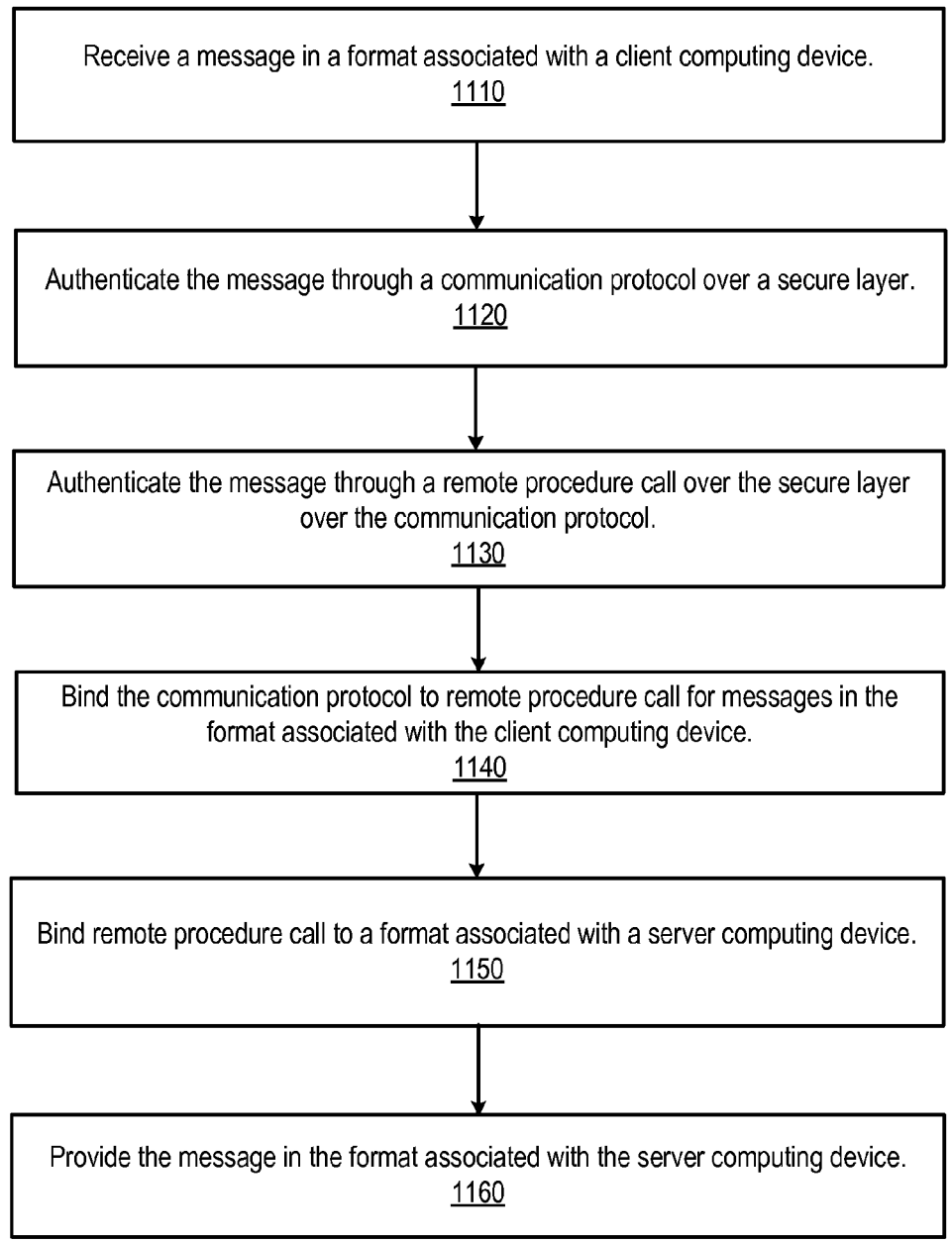
FIG. 11 illustrates an example of a process of authenticating a message received in a format associated with a client computing device format to a format associated with a server computing device in accordance with one aspect of the disclosure.

In accordance with one aspect of the disclosure, FIG. 11 illustrates an example of a process of authenticating a message received in a format associated with the client computing device 910 to a format associated with the server computing device 960.

At process 1110, the binding in module 934 receives a message in a format associated with the client computing device 910. In one implementation, the message is received from the client computing device 910.

At process 1120, the binding in module 934 authenticates the message from the client computing device 910 through a communication protocol, such as HTTPS, over a secure layer, such as secure socket layer (SSL) running in the firewall 920. In one aspect, the authentication may be completed using NT LAN Manager (NTLM).

At process 1130, the binding in module 934 authenticates the message through a remote procedure call over the secure layer, for example SSL, over the communications protocol, for example HTTPS.

At process 1140, the binding in module 934 binds the communication protocol, for example HTTPS, to remote procedure call (RPC) for messages in the format associated with the client computing device 910.

At process 1150, the binding in module 934 binds the remote procedure calls to a format associated with the remote server computing device 960, for example terminal services gateway (TSGW) if the remote server computing device 960 is implementing Microsoft Windows Server.

At process 1160, the binding in module 934 provides the message in a format associated with the server computing device 960, such as the TSGW format if the remote server computing device 960 is implementing Microsoft Windows Server. Marshalling may be used to change the format of the message.

Figure 12:
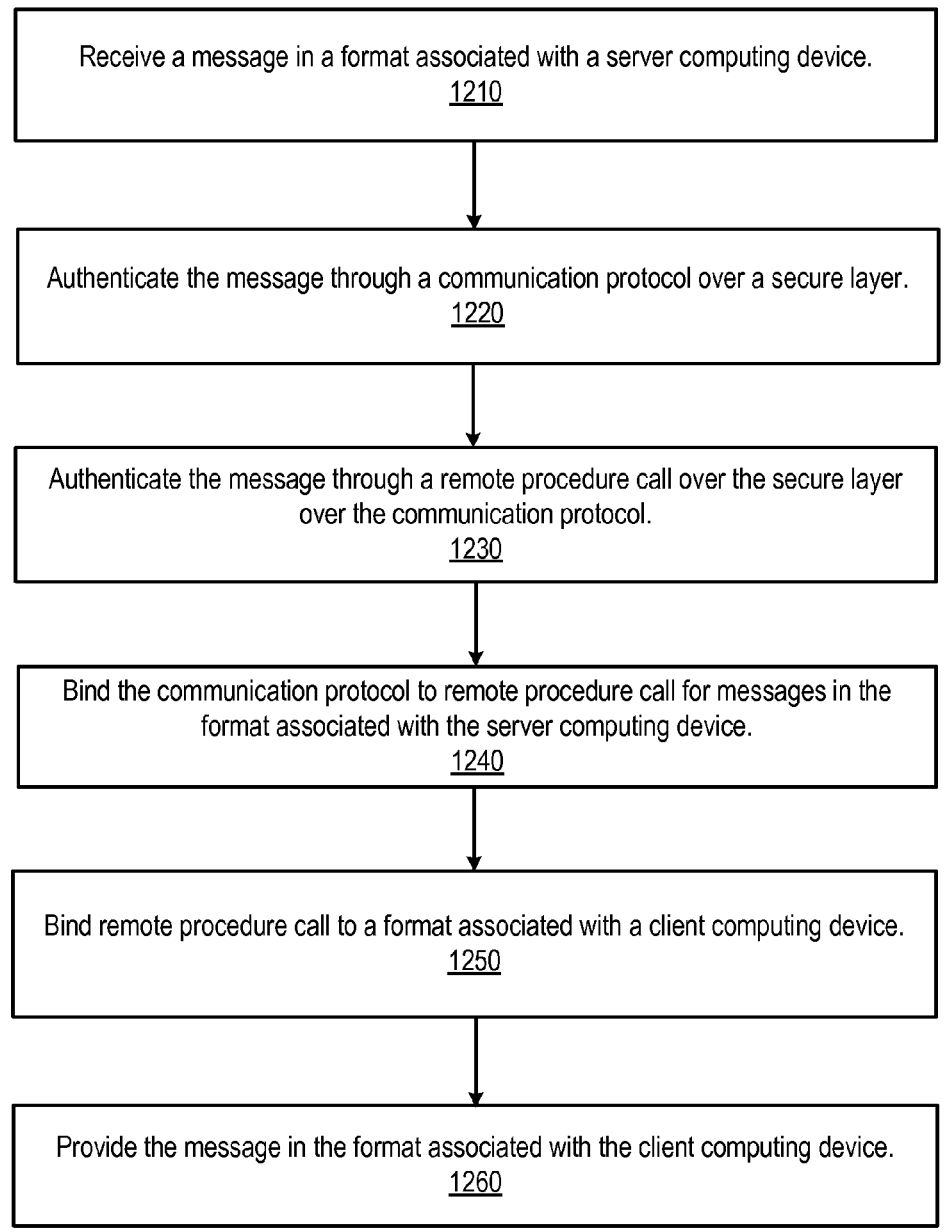
FIG. 12 illustrates an example of a process of authenticating a message received in a format associated with the server computing device to a format associated with a client computing device in accordance with one aspect of the disclosure.

In accordance with one aspect of the disclosure, FIG. 12 illustrates an example of a process of authenticating a message received in a format associated with the server computing device 960 to a format associated with the a client computing device 910.

At process 1210, the binding out module 936 receives a message in a format associated with the remote server computing device 960. In one implementation, the message is received from the remote server computing device 960.

At process 1220, the binding out module 936 authenticates the message from the server computing device 960 through a communication protocol, such as HTTPS, over a secure layer, such as SSL.

At process 1230, the binding out module 936 authenticates the message through a remote procedure call over the secure layer, for example SSL, over the communications protocol, for example HTTPS.

At process 1240, the binding out module 936 binds the communication protocol, for example HTTPS, to remote procedure call (RPC) for messages in the format associated with the server computing device 960.

At process 1250, the binding out module 936 binds the remote procedure call to a format associated with the client computing device 910.

At process 1260, the binding out module 936 provides the message in a format associated with the client computing device 910, such as the HTTPS format. Marshalling may be used to change the format of the message.

In one example, a process of the subject technology is described as follows:
Setup (Inbound)
    (1) NTLM Authentication through HTTP over SSL.
    (2) NTLM Authentication through RPC over SSL over HTTP.
    (3) HTTP to RPC Bindings.
Setup (Outbound)
    (4) NTLM Authentication through HTTP over SSL.
    (5) NTLM Authentication through RPC over SSL over HTTP.
    (6) HTTP to RPC Bindings.
Setup (RPC)
    (7) RPC to TSGW Bindings.
    (8) RPC Marshal size (32 bit).
TSGW via RPC
    (9) Operations 1-9 (OPNUM).

One function of the process outlined above may be the setup of an inbound web-service authenticated HTTPS pathway, and the setup of authenticated RPC inbound access. The process may also provide the setup of outbound web-service authenticated HTTPS pathway, and the setup of outbound authenticated RPC access. The process may also provide the setup of RPC binding to TSGW role and the setup of RPC marshalling data size (32 bit fields). The use of OPNUM can provide tunnel creation, tunnel authentication, channel creation, and channel binding. In one example, all OPNUM operations occur by use of a specialized RPC packet filter. These steps may be required to meet Microsoft's requirements for accessing TSGW role providing this service.

In one aspect, a unique HTTPS connection is created for inbound and outbound data. These are logically bound (by use of RPC protocol) to establish a single logical connection to RPC services. These are in turn bound to a TSGW using RPC protocol through a fixed filter mechanism. The result is the ability to exchange data using OPNUM. OPNUM are specialized syntax described by TSGW specification. In one aspect, these require RPC pathway from outside firewall to utilize. Once established, a Tunnel and Channel may be created for transporting of data from a client to a Target server, such as a RDP server. The result achieved may be a tunnel through the firewall 920 to Microsoft TSGW role with a channel (data path) from/to target host of the remote server computing device 960.

Figure 13:
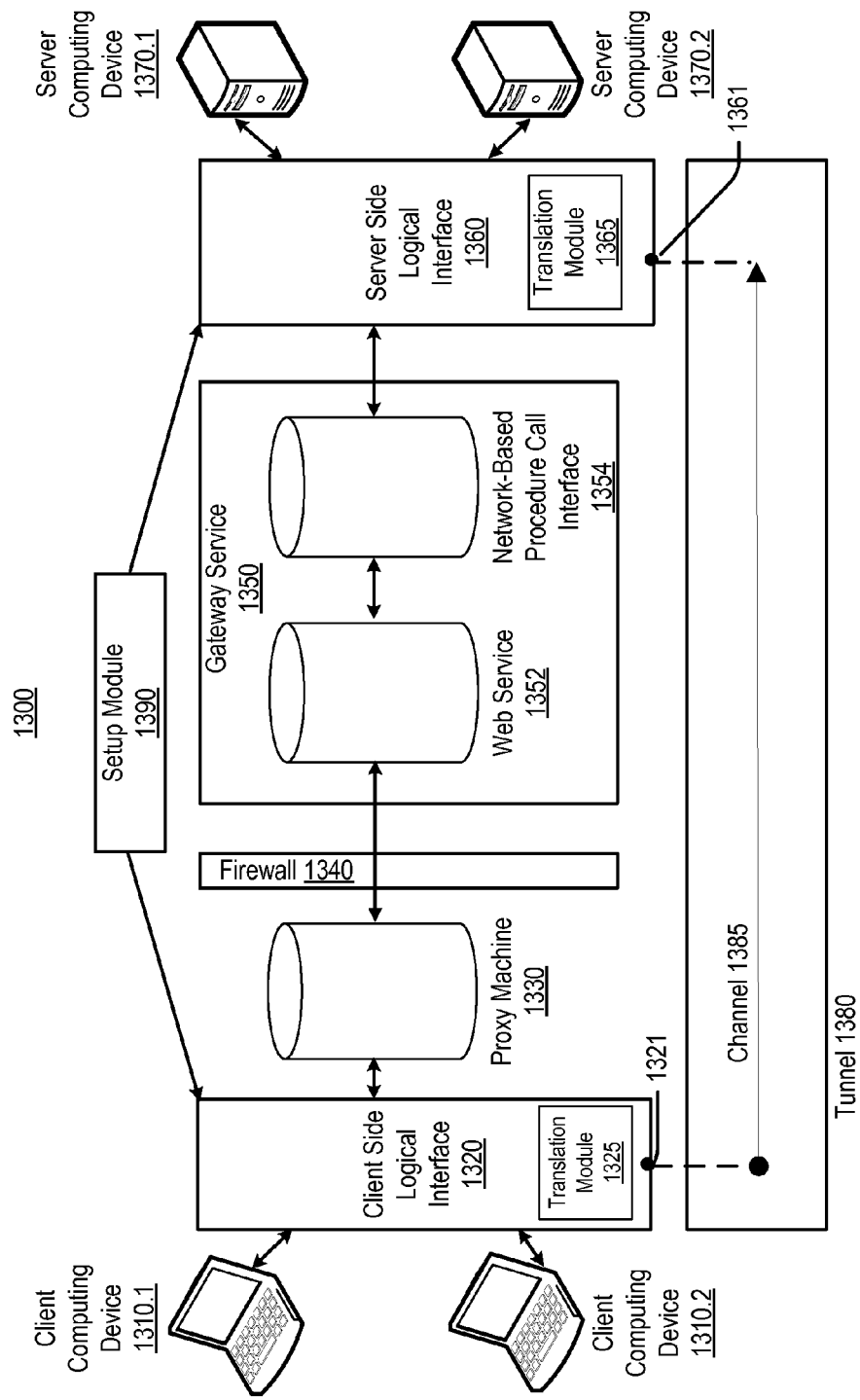
FIG. 13 illustrates an example of a client-server computer system configured to implement tunnel variable termination with split remote gateway client proxy.

Example of Client-Server Computer System Configured to Implement Tunnel Variable Termination with Split Remote Gateway Client Proxy FIG. 13 illustrates an example of a client-server computer system 1300 configured to implement tunnel variable termination with split remote gateway client proxy.

As shown, the client-server computer system 1300 may include one or more client computing devices 1310.1-1310.2, a client side logical interface 1320, a proxy machine 1330, a firewall 1340, a gateway service 1350, a server side logical interface 1360, one or more server computing devices 1370.1-1370.2, a tunnel 1380, and a setup module 1390. While two client computing devices 1310.1-1310.2 and two server computing devices 1370.1-1370.2 are illustrated, the subject technology may be implemented in conjunction with any number (e.g., one, two, three, or more than three) of client computing devices and/or any number (e.g., one, two, three, or more than three) of server computing devices. While a single client side logical interface 1320 and a single server side logical interface 1360 are illustrated, the subject technology may be implemented with one or multiple client side logical interfaces 1320 and/or one or multiple server side logical interfaces 1360.

The client computing devices 1310.1-1310.2 may be, for example, one or more of a laptop computer, a desktop computer, a tablet computer, a mobile phone, a netbook, a personal digital assistant (PDA), etc. In one advantageous aspect, the subject technology allows one or more of the client computing devices 1310.1-1310.2 to be implemented with a non-proprietary operating system that is not compatible with an operating system of one or more server computing devices 1370.1-1370.2. In another aspect, one or more of the client computing devices 1310.1-1310.2 may implement a proprietary operating system that is compatible with the operating system of one or more server computing devices 1370.1-1370.2. For example, the client computing device 1310.1 may implement Linux Ubuntu® and the client computing device 1310.2 may implement Microsoft Windows XP®, while the server computing devices 1370.1-1370.2 may implement Microsoft Windows Server®. While two client computing devices 1310.1-1310.2 are illustrated, the subject technology may be implemented with any number of client computing devices communicatively coupled with the client side logical interface 1320.

The client side logical interface 1320 or the server side logical interface may be a logical interface. A logical interface may include, for example, a network interface card (NIC), a physical network interface device (e.g., a router), or a virtual, software-only network interface module with no corresponding hardware components. In other words, a logical interface may, in one example, include the software for a NIC or a router, but not the corresponding hardware elements.

The client side logical interface 1320 may be configured to facilitate creation of a connection including the tunnel 1380 with one or more channels (e.g., channel 1385) between one or more client side logical interfaces and one or more server side logical interfaces. Each channel may be associated with a port forward having a client side logical interface and a corresponding server side logical interface (e.g., channel 1385 has client side logical interface 1320 and server side logical interface 1360). The client side logical interface 1320 and the server side logical interface 1360 may reside on opposite sides of the firewall 1340. The client side logical interface 1320 may be for one or more client protocol interfaces. The server side logical interface may be for one or more server protocol interfaces. Example client protocol interfaces may include SSH or HTTP. Example server protocol interfaces may include RPC or remote desktop protocol (RDP). The client side logical interface 1320 may be configured to receive a data unit for transmission between one of plural clients of the first client side logical interface and one of plural servers of the first server side logical interface via the connection including the tunnel. The data unit may be associated with an OSI model stack identifying a source and/or a destination of the data unit. The client side logical interface 1320 or the server side logical interface 1360 may provide access to one or more protocols for modifying the identified source or destination of the data unit and/or for transmitting the data unit. The client side logical interface may facilitate transmission of the data unit via the connection including the tunnel.

In one example, the client side logical interface 1320 and/or the server side logical interface 1360 may be implemented as a network interface card (NIC) having software and hardware components. In one example, the client side logical interface 1320 and/or the server side logical interface 1360 may be implemented as a virtual component, i.e., implemented as a pure software component without a corresponding hardware component. The client side logical interface 1320 may reside within one of the client computing devices 1310.1 or 1310.2 or externally to each of the client computing devices 1310.1 and 1310.2. The server side logical interface 1360 may reside within one of the server computing devices 1370.1 or 1370.2 or externally to each of the server computing devices 1370.1 and 1370.2.

In one aspect, the client side logical interface 1320 and/or the server side logical interface 1360 may facilitate specification, via protocol enhancement, of a protocol interface for communication with the channel 1385. The protocol interface is for communication between the client side logical interface 1320 and the server side logical interface 1360. Protocol enhancement may include, for example, adding novel modules, commands, and/or instructions to a protocol. For example, a translation module 1325 or 1365 may be added to a first protocol or associated with the first protocol. The translation module may be for translating the first protocol into a second protocol. In one aspect, the translation module(s) 1325 or 1365 are created in real-time, during the operation of the client side logical interface 1320 or the server side logical interface 1360. In one aspect, the translation module(s) 1325 or 1365 are created before an operation of the client side logical interface 1320 or the server side logical interface 1360.

The one or more protocols for modifying the identified source or destination of the data unit may include one or more protocols for replacing a header in a specified layer of the OSI model stack (e.g., one of the layers 1-7 of the OSI model stack) of the data unit with a header associated with a modified source or a modified destination. Alternatively, the one or more protocols for modifying the identified source or destination of the data unit include one or more protocols for copying data blocks of a first layer of the OSI model stack (e.g., one of the layers 1-7 of the OSI model stack) of the data unit into data blocks of a second layer of the OSI model stack for the data unit. The second layer is a higher number layer than the first layer. For example, the second layer may be layer 7, and the first layer may be layer 4.

A port forward (e.g., one or more of 1321 and/or 1361) may comprise a logical port(s) or a physical port(s). In some aspects, a port forward may include one or more of: module(s) for translating an address and/or a port number of a packet to a new destination, module(s) for transmitting or receiving packet(s) over a firewall (e.g., firewall 1340), module(s) for forwarding packet(s) according to a routing table.

The server side logical interface 1360 operates in a manner similar or parallel to the client side logical interface 1320. However, the client side logical interface 1320 has local client computing devices 1310.1-1310.2 and remote server computing devices 1370.1-1370.2, while the server side logical interface 1360 has local server computing devices 1370.1-1370.2 and remote client computing devices 1310.1-1310.2.

The proxy machine 1330 is configured to facilitate communication between the client side logical interface 1320 and the server side logical interface 1360. The proxy machine may be configured to translate between a format associated with the client computing devices 1310.1-1310.2 (e.g., SSH or HTTPS) and a protocol associated with the server computing devices 1370.1-1370.2 (e.g., TSGW or RPC), as described in detail above, for example, in conjunction with FIG. 3. In one aspect, the operation of the proxy machine 1330 is similar to the operation of the proxy machine 220 described in conjunction with FIGS. 2-3.

The firewall 1340 may function to create or deny network connections based on a set of rules. In one aspect, the firewall 1340 operates similarly to the firewall 120 of FIG. 1 or the firewall 920 of FIG. 9.

The gateway service 1350 may be a TSGW service. The gateway service 1350 may, for example, include all or a portion of the functions of the service 125 of FIGS. 1-2 or the gateway server 950 of FIG. 9. As illustrated in FIG. 13, the gateway service 1350 includes a web service 1352 and a network-based procedure call interface 1354 (e.g., a RPC interface). The web service 1352 may include a web server that is configured to communicate with the proxy machine 1330 over the firewall 1340. The network-based procedure call interface 1354 may be, for example, an RPC interface. The network-based procedure call interface 1354 may, for example, function similarly to the network-based procedure call interface 140 of FIGS. 1-2 or the RPC server 940 of FIG. 9.

The server side logical interface 1360 may be a logical interface (e.g., a router, a network interface, a transmission control protocol port, or a user datagram protocol port) communicatively coupled with the one or more server computing devices 1370.1-1370.2. The server side logical interface 1360 may be configured to facilitate receiving a message from one of the server computing devices 1370.1-1370.2. The message may be associated with a protocol in a first layer (e.g., an application layer) of an open systems interconnection (OSI) model. The server side logical interface 1360 may be configured to facilitate transmitting the message, via a port forward connected to the server side logical interface 1360, to the client side logical interface 1320. The port forward may be associated with a protocol in a second layer (e.g., a transport layer) of the open systems interconnect (OSI) model. The first layer may be different from the second layer.

One or more of the server computing devices 1370.1-1370.2 may be configured to implement a proprietary operating system (e.g., Microsoft Windows Server® or Apple Os X Lion Server®).

In some aspects, the server computing devices 1370.1-1370.2 may be configured to receive messages from client computing devices (e.g., client computing devices 1310.1-1310.2) via, for example, the client side logical interface 1320, the proxy machine 1330, the gateway service 1350, and the server side logical interface 1360 and to respond to the messages, for example, via operation of the server side logical interface 1360, the gateway service 1350, the proxy machine 1330, and the client side logical interface 1320.

One or more of the server computing devices 1370.1-1370.2 may be configured to implement RPC or TSGW. While two server computing devices 1370.1-1370.2 are illustrated, the subject technology may be implemented with any number of server computing devices communicatively coupled with the server side logical interface 1360.

In one aspect, a tunnel 1380 may be created between the client side logical interface 1320 (which may be for multiple client computing devices 1310.1-1310.2) and the server side logical interface 1360 (which may be for multiple server computing devices 1370.1-1370.2), facilitating communication between the client side logical interface 1320 and the server side logical interface 1360. In one aspect the tunnel 1380 includes a channel 1385 connecting the client side logical interface 1320 with the server side logical interface 1360. In one aspect, there are multiple server side logical interfaces 1360 connected to a client side logical interface 1320 using a single tunnel 1380 and multiple channels 1385. In some aspects, the operation of the tunnel 1380 and the channel 1385 may be, for example, similar to the operation of the tunnel 170 and the channel 175 of FIG. 1 or the tunnel 270 and the channel 275 of FIG. 2.

The setup module 1390 may be configured to facilitate creating a gateway connection (e.g., via the gateway service 1350) between one or more client side logical interfaces 1320 and one or more server side logical interfaces 1360. The gateway connection may be a TSGW connection. The setup module 1390 may be configured to facilitate coupling the client side logical interface 1320 and the server side logical interface 1360. The client side logical interface and the server side logical interface may be coupled via one or more ports forward. The ports forward may be associated with the gateway connection. The setup module 1390 may be configured to facilitate transmitting data, via the ports forward, between a client computing device (e.g., client computing device 1310.1 or 1310.2) communicatively coupled with the client side logical interface 1320 and a server computing device (e.g., server computing device 1370.1 or 1370.2) communicatively coupled with the server side logical interface 1360.

Advantageously, in some implementations of the client-server computer system 1300, multiple client computing devices 1300.1-2 may be connected with multiple server computing devices 1370.1-1370.2 via a single data path between the client side logical interface 1320 and the server side logical interface 1360. Multi-port capabilities (as in a virtual private network) through a single data path using an end-to-end protocol definition may be provided. Ports may be terminated at the logical interfaces (e.g., client side logical interface 1320 or server side logical interface 1360).

In some implementations, piercing a firewall (e.g., firewall 1340) may require tunneling capabilities (e.g., tunnel 1380) that allow for data paths (channels, e.g., channel 1385) to be established between machines inside and outside of an environment (i.e., a side of the firewall 1340). Each tunnel/channel combination (e.g., tunnel 1380 and channel 1385) may, in some implementations, require unique handling and routing within the protocol layer itself. In some aspects, the subject technology may provide, among other things, routing at the routing level within the host's Internet protocol (IP) table or by using end-to-end port forward. The attachment of logical interfaces (client side logical interface 1320 or server side logical interface 1360) to terminate/source data on both sides of a tunnel/channel may, in some aspects, enable the creation of a virtual private network (VPN) or a VPN-hybrid. The VPN or VPN-hybrid may use, for example, Microsoft® components. In some implementations, the logical interfaces 1320 or 1360 may be translatable. The logical interfaces 1320 or 1360 may correspond to one or more of a transmission control protocol (TCP) port, a user datagram protocol (UDP) port, a network interface, an application, or any combination thereof.

In some implementations, Microsoft's TSGW/RDGW® does not provide a means to create a VPN. Adding the translatable termination described herein enables the single data path between the logical interfaces 1320 and 1360 to function as a VPN, a transcoder, or an application interface. However, the subject technology is not limited to TSGW or RDGW endpoints.

Creating a unique connection for every client computing device 1310.1-1310.2 and every server computing device 1370.1-1370.2 may, in some examples, be costly. The routing protocol may, in some examples, be less efficient than a network stack. Furthermore, the available ports may be a limited resource that may be consumed with each definition used. One or more modules to traffic to many hosts through a firewall by use of a routing table may be provided. One or more modules may translate between protocols (e.g., between TCP and UDP, for example, in a domain name server or time server application). The subject technology may be implemented in conjunction with TSGW. For example, the gateway service 1350 may implement TSGW.

The subject technology may provide, for example, among other things, for transcoding, routing, filtering, or managing data through a single pipe to one or many different locations in conjunction with a protocol. The protocol may be capable of providing access in the same manner.

In some examples, the subject technology may include the client side interface termination 1320 and a single server computing device (e.g., server computing device 1370.1 or 1370.2) in place of the server side interface termination 1360. In some examples, the subject technology may include the server side interface termination 1360 and a single client computing device (e.g., client computing device 1310.1 or 1310.2) in place of the client side interface termination 1320. In some examples, the subject technology may include both the client side interface termination 1320 and the server side interface termination 1360.

A TSGW connection may correspond to a tunnel/channel (e.g., tunnel 1380 and channel 1385) connection through a firewall (e.g., firewall 1340), among other things. The channel 1385 may be terminated at the client side interface termination 1320 and the server side interface termination 1360. In one aspect, once the client side interface termination 1320 and the server side interface termination 1360 are established, handling, transcoding, or routing may take place. As a result, the data path (e.g., tunnel 1380 or channel 1385) between the client side interface termination 1320 and the server side interface termination 1360 may, in some aspects, permit any method of trafficking, for example, without limitation to the restrictions of TSGW.

Setup may involve, for example creating a TSGW connection (e.g., via gateway service 1350) between the client side interface termination 1320 and the server side interface termination 1360. Setup may involve facilitating routing if an interface is involved, facilitating function attachment if an application is involved, or transcoding if a protocol change (e.g., between SSH and TSGW) is involved.

A TSGW connection in the form of a tunnel/channel may be set up. TCP traffic may be exchanged between the endpoints (e.g., logical interfaces 1320 and 1360). The logical interfaces 1320 and 1360 may transcode to an appropriate paradigm (e.g., the client side logical interface 1320 may transcode to SSH for communication with the client computing devices 1310.1-1310.2; the server side logical interface 1360 may transcode to RDP for communication with the server computing devices 1370.1-1370.2). As a result, in some aspects, any method of communication may be possible using TCP/IP, UDP/IP, Function/IP, VPN, or hybrid translation, among other protocols. In some examples, an interface of the gateway service 1350 (e.g., TSGW) is used for establishing a data pump between the client side logical interface 1320 and the server side logical interface 1360. Once data is exchanged, the data may be managed at client side logical interface 1320 (e.g., forwarded to one or more of the client computing devices 1310.1-1310.2) or managed at the server side logical interface 1360 (e.g., forwarded to one or more of the server computing devices 1370.1-1370.2).

The client side logical interface 1320 may send or route IP traffic through the proxy machine 1330 over HTTPS or through the gateway service 1350 to the server side logical interface 1360. The server side logical interface 1360 may include a routable IP stack, a port, or a function. The client side logical interface 1320 may be suitable for trafficking data between the client computing devices 1310.1-1310.2 and the server computing device 1370.1-1370.2. The client side logical interface 1320 may transparently send data through the gateway service 1350 via the proxy machine 1330. The data may be used in a source or sink (among the client computing devices 1310.1-1310.2 or the server computing device 1370.1-1370.2 as appropriate for a specific application in conjunction with which the subject technology may be used).

In some examples, the client side logical interface may be external to the client computing device and the server side logical interface may be external to the server computing device. In some examples, the client side logical interface may be internal to the client computing device and the server side logical interface may be internal to the server computing device. In some examples, one of the client side logical interface or the server side logical interface is internal to the client computing device or the server computing device, respectively, while the other of the client side logical interface or the server side logical interface is external to the client computing device or the server computing device, respectively.

The subject technology may implement a multiplexor/demultiplexor architecture. For example, in a data transmission from a client computing device 1310.1-1310.2 to a server computing device 1370.1-1370.2, data from one or more client computing devices 1310.1-1310.2 may be multiplexed at the client side logical interface 1320 and data directed to one or more server computing devices 1370.1-1370.2 may be demultiplexed at the server side logical interface 1360.

In one aspect, the server computing device 1370.1-1370.2 communicatively coupled with the server side logical interface 1360 implements a proprietary operating system (e.g., Microsoft Windows Server®). In one aspect, the client computing device 1310.1-1310.2 communicatively coupled with the client side logical interface 1320 does not implement a proprietary operating system associated with the operating system of the server computing device 1370.1-1370.2. For example, the client computing device 1310.1-1310.2 may implement a Linux Ubuntu® operating system. Alternatively, the client computing device 1310.1-1310.2 may implement a proprietary operating system associated with the operating system of the server computing device 1370.1-1370.2. For example, the client computing device 1310.1-1310.2 may implement a Microsoft Windows® operating system.

In some aspects, a term—proprietary—includes non-open source. For example, an arbitrary developer, who does not have access to specific data (e.g., source code of a program, source code of an operating system, source code of a platform) associated with a software provider (e.g., Microsoft® or Apple®) may not be able to develop software for managing or using proprietary data, proprietary operating systems, or proprietary platforms. Open source data, operating systems, or platforms are publically accessible. As such, an arbitrary developer may provide software for managing or using open source data, operating systems, or platforms without requiring any specific data associated with a software provider.

In some aspects, an operating system family (e.g., a Microsoft® operating system family including Microsoft Windows XP® and Microsoft Windows Server®) may be a proprietary operating system family. Computing devices implementing proprietary operating systems within the proprietary operating system family may be configured to exchange data with one another via a proprietary protocol. (E.g., a client implementing Microsoft Windows XP® may exchange data with a server implementing Microsoft Windows Server® using, for example, RDP or TSGW.) Other operating systems, for example, operating systems outside the proprietary operating system family (e.g., Linux Ubuntu® or Google Chrome®) may not be configured to exchange data using the proprietary protocol (e.g., RDP or TSGW). As such, clients implementing non-proprietary operating systems (e.g., Linux Ubuntu® or Google Chrome®) may not be able to exchange data or communicate with servers implementing proprietary operating systems (e.g., Microsoft Windows Server®).

In some aspects, a proprietary protocol includes any non-public or non-open source protocol for exchanging data (e.g., transmitting and/or receiving messages).

An example of an operating system family is the Microsoft® operating system family. In the Microsoft® operating system family, servers implementing Microsoft Server® are configured to communicate with clients implementing Microsoft Windows®, for example, via TSGW, a proprietary protocol. However, in one aspect, clients implementing non-Microsoft operating systems (e.g., Linux Ubuntu® or Google Chrome®) may not implement the TSGW proprietary protocol and, thus, may be unable to communicate with servers implementing Windows Server®.

In some advantageous aspects, the subject technology allows a client computing device and a server computing device to implement incompatible operating systems (e.g., incompatible operating systems from different operating system families). For example, a client computing device may implement Linux Ubuntu® and a server computing device may implement Microsoft Windows Server®. In some aspects, a client computing device and a server computing device may implement compatible operating systems from the same operating system family. For example, a client computing device may implement Apple OS X Lion® and a server computing device may implement Apple Mac OS X Server Snow Leopard®.

Example Operation of Logical Interface

FIG. 14A is a flow chart illustrating an example of a process 1400A for an operation of a client side logical interface.

The process 1400A begins at operation 1410A, where the client side logical interface facilitates creation of a connection comprising a tunnel with one or more channels between a client side logical interface and a server side logical interface, wherein each channel is associated with a port forward (e.g., 1321 and/or 1361) of the client side logical interface and the server side logical interface, wherein the client side logical interface and the server side logical interface reside on opposite sides of a firewall, wherein the client side logical interface is for one or more client protocol interfaces, and wherein the server side logical interface is for one or more server protocol interfaces.

In operation 1420A, the client side logical interface receives a data unit for transmission between one of plural clients of the client side logical interface and one of plural servers of the server side logical interface via the connection comprising the tunnel, wherein the data unit is associated with an open systems interconnection (OSI) model stack identifying a source or a destination of the data unit, and wherein the client side logical interface or the server side logical interface provides access to one or more protocols for modifying the identified source or destination of the data unit and for transmitting the data unit.

In operation 1430A, the client side logical interface facilitates transmission of the data unit via the connection comprising the tunnel.

Example Instructions for Operation of Logical Interface

Figure 14B:
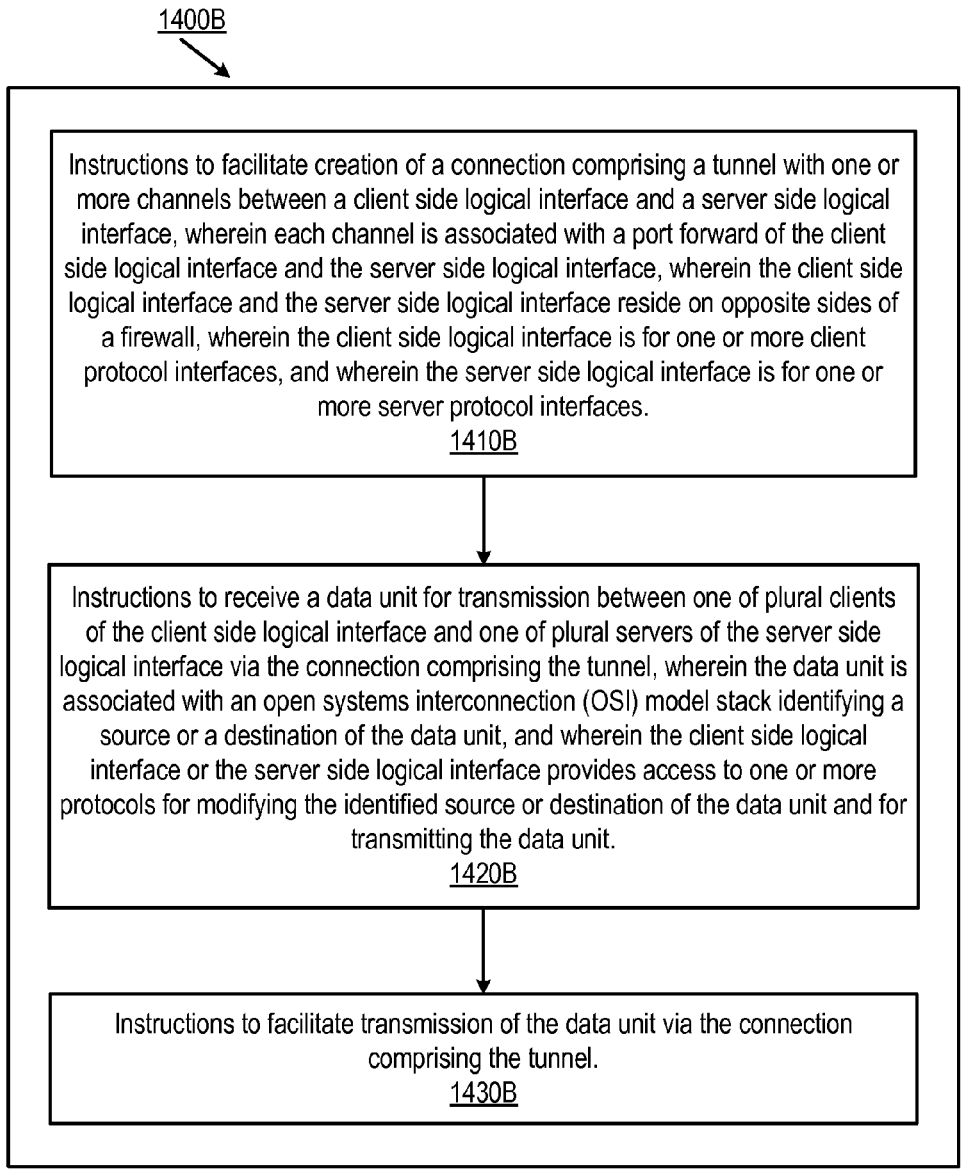
FIG. 14B is an example of a device including instructions for an operation of a first logical interface.

FIG. 14B is an example of a device 1400B including instructions for an operation of a first logical interface.

The device 1400B may include instructions 1410B for facilitating creation of a connection comprising a tunnel with one or more channels between a client side logical interface and a server side logical interface, wherein each channel is associated with a port forward of the client side logical interface and the server side logical interface, wherein the client side logical interface and the server side logical interface reside on opposite sides of a firewall, wherein the client side logical interface is for one or more client protocol interfaces, and wherein the server side logical interface is for one or more server protocol interfaces.

The device 1400B may include instructions 1420B for receiving a data unit for transmission between one of plural clients of the client side logical interface and one of plural servers of the server side logical interface via the connection comprising the tunnel, wherein the data unit is associated with an open systems interconnection (OSI) model stack identifying a source or a destination of the data unit, and wherein the client side logical interface or the server side logical interface provides access to one or more protocols for modifying the identified source or destination of the data unit and for transmitting the data unit.

The device 1400B may include instructions 1430B for facilitating transmission of the data unit via the connection comprising the tunnel.

Example Modules for Operation of Logical Interface

Figure 14C:
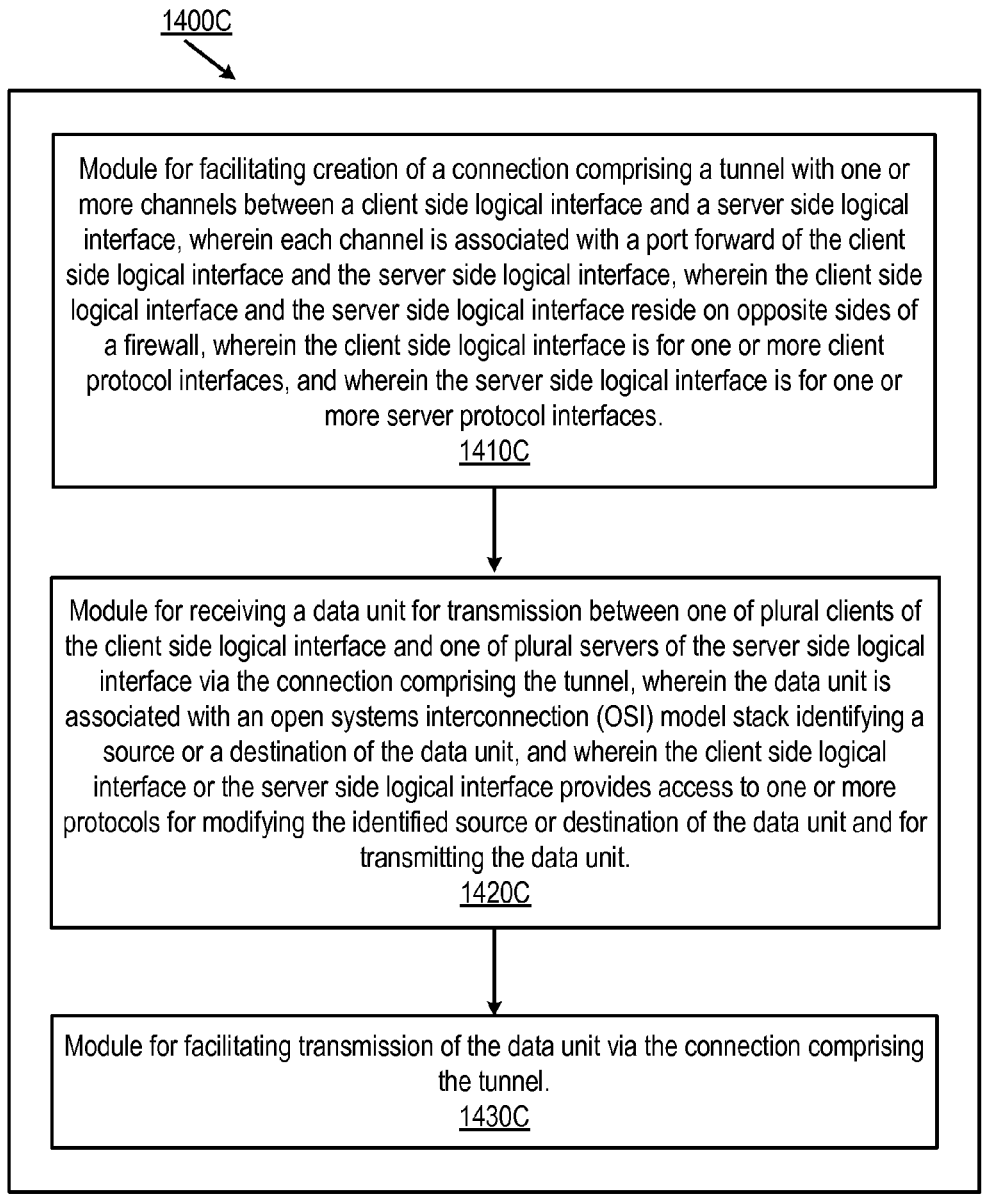
FIG. 14C is an example of a device including one or more modules for an operation of a first logical interface.

FIG. 14C is an example of a device 1400C including one or more modules for an operation of a first logical interface.

The device 1400C may include a module 1410C for facilitating creation of a connection comprising a tunnel with one or more channels between a client side logical interface and a server side logical interface, wherein each channel is associated with a port forward of the client side logical interface and the server side logical interface, wherein the client side logical interface and the server side logical interface reside on opposite sides of a firewall, wherein the client side logical interface is for one or more client protocol interfaces, and wherein the server side logical interface is for one or more server protocol interfaces.

The device 1400C may include a module 1420C for receiving a data unit for transmission between one of plural clients of the client side logical interface and one of plural servers of the server side logical interface via the connection comprising the tunnel, wherein the data unit is associated with an open systems interconnection (OSI) model stack identifying a source or a destination of the data unit, and wherein the client side logical interface or the server side logical interface provides access to one or more protocols for modifying the identified source or destination of the data unit and for transmitting the data unit.

The device 1400C may include a module 1430C for facilitating transmission of the data unit via the connection comprising the tunnel.

Illustration of Subject Technology as Clauses

Various examples of aspects of the disclosure are described as numbered clauses (1, 2, 3, etc.) for convenience. These are provided as examples, and do not limit the subject technology. Identifications of the figures and reference numbers are provided below merely as examples and for illustrative purposes, and the clauses are not limited by those identifications.

1. A computer-implemented method for facilitating communication of data between a client and a server, the method comprising:

facilitating creation of a connection comprising a tunnel with one or more channels between a client side logical interface and a server side logical interface, wherein each channel is associated with a port forward of the client side logical interface and the server side logical interface, wherein the client side logical interface and the server side logical interface reside on opposite sides of a firewall, wherein the client side logical interface is for one or more client protocol interfaces, and wherein the server side logical interface is for one or more server protocol interfaces;

receiving a data unit for transmission between one of plural clients of the client side logical interface and one of plural servers of the server side logical interface via the connection comprising the tunnel, wherein the data unit is associated with an open systems interconnection (OSI) model stack identifying a source or a destination of the data unit, and wherein the client side logical interface or the server side logical interface is configured to provide access to one or more protocols for modifying the identified source or destination of the data unit and for transmitting the data unit; and facilitating transmission of the data unit via the connection comprising the tunnel.

2. The method of clause 1, wherein the client side logical interface is one of plural client side logical interfaces coupled with the tunnel.

3. The method of clause 2, wherein the client side logical interface resides externally to each of the plural clients of the client side logical interface.

4. The method of clause 1, wherein the server side logical interface is one of plural server side logical interfaces coupled with the tunnel.

5. The method of clause 4, wherein the server side logical interface resides externally to each of the plural servers of the server side logical interface.

6. The method of clause 1, wherein the client side logical interface comprises a software interface without a corresponding hardware component.

7. The method of clause 1, wherein the server side logical interface comprises a software interface without a corresponding hardware component.

8. The method of clause 1, further comprising:

facilitating specification, via protocol enhancement, of a protocol interface for communication within a channel of the tunnel, wherein the protocol interface is for a protocol for communication between the client side logical interface and the server side logical interface.

9. The method of clause 1, wherein the one or more protocols for modifying the identified source or destination of the data unit comprise one or more protocols for replacing a header in a specified layer of an open systems interconnection (OSI) model stack for the data unit with a header associated with a modified source or a modified destination.

10. The method of clause 1, wherein the one or more protocols for modifying the identified source or destination of the data unit comprise one or more protocols for causing the one or more processors to copy data blocks of a first layer of an open systems interconnection (OSI) model stack for the data unit into data blocks of a second layer of the open systems interconnection (OSI) model stack for the data unit, wherein the second layer is a higher number layer than the first layer.

11. A non-transitory machine-readable medium comprising instructions stored therein, the instructions executable by one or more processors to perform a method, the method comprising:

facilitating creation of a connection comprising a tunnel with one or more channels between a client side logical interface and a server side logical interface, wherein each channel is associated with a port forward of the client side logical interface and the server side logical interface, wherein the client side logical interface and the server side logical interface reside on opposite sides of a firewall, wherein the client side logical interface is for one or more client protocol interfaces, and wherein the server side logical interface is for one or more server protocol interfaces;

receiving a data unit for transmission between one of plural clients of the client side logical interface and one of plural servers of the server side logical interface via the connection comprising the tunnel, wherein the data unit is associated with an open systems interconnection (OSI) model stack identifying a source or a destination of the data unit, and wherein the client side logical interface or the server side logical interface is configured to provide access to one or more protocols for modifying the identified source or destination of the data unit and for transmitting the data unit; and facilitating transmission of the data unit via the connection comprising the tunnel.

12. The non-transitory machine-readable medium of clause 11, wherein the client side logical interface is one of plural client side logical interfaces coupled with the tunnel.

13. The non-transitory machine-readable medium of clause 12, wherein the client side logical interface resides externally to each of the plural clients of the client side logical interface.

14. The non-transitory machine-readable medium of clause 11, wherein the server side logical interface is one of plural server side logical interfaces coupled with the tunnel.

15. The non-transitory machine-readable medium of clause 14, wherein the server side logical interface resides externally to each of the plural servers of the server side logical interface.

16. The non-transitory machine-readable medium of clause 11, wherein the client side logical interface comprises a software interface without a corresponding hardware component.

17. The non-transitory machine-readable medium of clause 11, wherein the server side logical interface comprises a software interface without a corresponding hardware component.

18. The non-transitory machine-readable medium of clause 11, wherein the method further comprises:

facilitating specification, via protocol enhancement, of a protocol interface for communication within a channel of the tunnel, wherein the protocol interface is for a protocol for communication between the client side logical interface and the server side logical interface.

19. The non-transitory machine-readable medium of clause 11, wherein the one or more protocols for modifying the identified source or destination of the data unit comprise one or more protocols for replacing a header in a specified layer of an open systems interconnection (OSI) model stack for the data unit with a header associated with a modified source or a modified destination.

20. The non-transitory machine-readable medium of clause 11, wherein the one or more protocols for modifying the identified source or destination of the data unit comprise one or more protocols for causing the one or more processors to copy data blocks of a first layer of an open systems interconnection (OSI) model stack for the data unit into data blocks of a second layer of the open systems interconnection (OSI) model stack for the data unit, wherein the second layer is a higher number layer than the first layer.

21. A system comprising:
one or more modules configured to facilitate creation of a connection comprising a tunnel with one or more channels between a client side logical interface and a server side logical interface, wherein each channel is associated with a port forward of the client side logical interface and the server side logical interface, wherein the client side logical interface and the server side logical interface reside on opposite sides of a firewall, wherein the client side logical interface is for one or more client protocol interfaces, and wherein the server side logical interface is for one or more server protocol interfaces;
one or more modules configured to receive a data unit for transmission between one of plural clients of the client side logical interface and one of plural servers of the server side logical interface via the connection comprising the tunnel, wherein the data unit is associated with an open systems interconnection (OSI) model stack identifying a source or a destination of the data unit, and wherein the client side logical interface or the server side logical interface is configured to provide access to one or more protocols for modifying the identified source or destination of the data unit and for transmitting the data unit; and
one or more modules configured to facilitate transmission of the data unit via the connection comprising the tunnel.

22. The system of clause 21, wherein the client side logical interface is one of plural client side logical interfaces coupled with the tunnel.

23. The system of clause 22, wherein the client side logical interface resides externally to each of the plural clients of the client side logical interface.

24. The system of clause 21, wherein the server side logical interface is one of plural server side logical interfaces coupled with the tunnel.

25. The system of clause 24, wherein the server side logical interface resides externally to each of the plural servers of the server side logical interface.

26. The system of clause 21, wherein the client side logical interface comprises a software interface without a corresponding hardware component.

27. The system of clause 21, wherein the server side logical interface comprises a software interface without a corresponding hardware component.

28. The system of clause 21, further comprising:
one or more modules configured to facilitate specification, via protocol enhancement, of a protocol interface for communication within a channel of the tunnel, wherein the protocol interface is for a protocol for communication between the client side logical interface and the server side logical interface.

29. The system method of clause 21, wherein the one or more protocols for modifying the identified source or destination of the data unit comprise one or more protocols for replacing a header in a specified layer of an open systems interconnection (OSI) model stack for the data unit with a header associated with a modified source or a modified destination.

30. The method of clause 21, wherein the one or more protocols for modifying the identified source or destination of the data unit comprise one or more protocols for causing the one or more processors to copy data blocks of a first layer of an open systems interconnection (OSI) model stack for the data unit into data blocks of a second layer of the open systems interconnection (OSI) model stack for the data unit, wherein the second layer is a higher number layer than the first layer.

Other Remarks

In one aspect, any of the clauses herein may depend from any one of the independent clauses or any one of the dependent clauses. In one aspect, any of the clauses (e.g., dependent or independent clauses) may be combined with any other clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

In one aspect, any methods, instructions, code, means, logic, components, blocks, modules and the like (e.g., software or hardware) described or claimed herein can be represented in drawings (e.g., flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions/claims are explicitly represented in drawings, but any of the clauses/descriptions/claims can be represented in drawings in a manner similar to those drawings explicitly shown. For example, a flow chart can be drawn for any of the clauses, sentences or claims for a method such that each operation or step is connected to the next operation or step by an arrow. In another example, a block diagram can be drawn for any of the clauses, sentences or claims having means-for elements (e.g., means for performing an action) such that each means-for element can be represented as a module for element (e.g., a module for performing an action).

Those of skill in the art would appreciate that items such as the various illustrative blocks, modules, elements, components, methods, operations, steps, and algorithms described herein (e.g., the service incompatible client 210, the proxy machine 220, the firewall 120, the binding interface 130, the network-based procedure call interface 140, the gateway interface 150, the remote server computing device 160, and the components therein) may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (e.g., one or more of blocks, modules, elements, components or processors) for performing one or more functions or operations. In one aspect, such an item may be an apparatus, hardware, or a portion thereof. In one example, an item may have a structure in the form of, for example, an instruction(s) for performing the function(s) or operation(s), where the instruction(s) are encoded or stored on a machine-readable medium, on another device, or on a portion thereof, where an instruction(s) may be software, an application(s), a subroutine(s), or a portion thereof. In an example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc., or a portion(s) or a combination(s) of any of the foregoing). Those skilled in the art will recognize how to implement the instructions, circuits, and processing systems.

A reference to an element in the singular is not intended to mean "one and only one" unless specifically so stated, but rather "one or more." For example, a message may refer to one or more messages.

Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect of the disclosure, when actions or functions are described as being performed by an item (e.g., receiving, determining, providing, generating, converting, displaying, notifying, accepting, selecting, controlling, transmitting, reporting, sending, authenticating, verifying, binding, creating, or any other action or function), it is understood that such actions or functions may be performed by the item directly. In another example, when an item is described as performing an action, the item may be understood to perform the action indirectly, for example, by facilitating (e.g., enabling, causing or performing a portion of) such an action. For example, generating can refer to facilitating generation. In one aspect, performing an action may refer to performing a portion of the action (e.g., performing a beginning part of the action, performing an end part of the action, or performing a middle portion of the action).

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled.

Various items may be arranged differently (e.g., arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

What is claimed is:

1. A computer-implemented method for facilitating communication of data between a client and a server, the method comprising:
    facilitating creation of a connection comprising a tunnel with one or more channels between a client side logical interface and a server side logical interface, wherein each channel is associated with a port forward of the client side logical interface and the server side logical interface, wherein the client side logical interface and the server side logical interface reside on opposite sides of a firewall, wherein the client side logical interface is for one or more client protocol interfaces, and wherein the server side logical interface is for one or more server protocol interfaces;
    receiving a data unit for transmission between one of plural clients of the client side logical interface and one of plural servers of the server side logical interface via the connection comprising the tunnel, wherein the data unit is associated with an open systems interconnection (OSI) model stack identifying a source or a destination of the data unit, and wherein the client side logical interface or the server side logical interface is configured to provide access to one or more protocols for modifying the identified source or destination of the data unit and for transmitting the data unit;
    translating, according to a routing table, between one or more client protocol interfaces and one or more server protocol interfaces; and
    facilitating transmission of the data unit via the connection comprising the tunnel.

2. The method of claim 1, wherein the client side logical interface is one of plural client side logical interfaces coupled with the tunnel.

3. The method of claim 2, wherein the client side logical interface resides externally to each of the plural clients of the client side logical interface.

4. The method of claim 1, wherein the server side logical interface is one of plural server side logical interfaces coupled with the tunnel.

5. The method of claim 4, wherein the server side logical interface resides externally to each of the plural servers of the server side logical interface.

6. The method of claim 1, wherein the client side logical interface comprises a software interface without a corresponding hardware component.

7. The method of claim 1, wherein the server side logical interface comprises a software interface without a corresponding hardware component.

8. The method of claim 1, further comprising:
    facilitating specification, via protocol enhancement, of a protocol interface for communication within a channel of the tunnel, wherein the protocol interface is for a protocol for communication between the client side logical interface and the server side logical interface.

9. The method of claim 1, wherein the one or more protocols for modifying the identified source or destination of the data unit comprise one or more protocols for replacing a header in a specified layer of an open systems interconnection (OSI) model stack for the data unit with a header associated with a modified source or a modified destination.

10. The method of claim 1, wherein the one or more protocols for modifying the identified source or destination of the data unit comprise one or more protocols for causing the one or more processors to copy data blocks of a first layer of an open systems interconnection (OSI) model stack for the data unit into data blocks of a second layer of the open systems interconnection (OSI) model stack for the data unit, wherein the second layer is a higher number layer than the first layer.

11. A non-transitory machine-readable medium comprising instructions stored therein, the instructions executable by one or more processors to perform a method, the method comprising:
    facilitating creation of a connection comprising a tunnel with one or more channels between a client side logical interface and a server side logical interface, wherein each channel is associated with a port forward of the client side logical interface and the server side logical interface, wherein the client side logical interface and the server side logical interface reside on opposite sides of a firewall, wherein the client side logical interface is for one or more client protocol interfaces, and wherein the server side logical interface is for one or more server protocol interfaces;
    receiving a data unit for transmission between one of plural clients of the client side logical interface and one of plural servers of the server side logical interface via the connection comprising the tunnel, wherein the data unit is associated with an open systems interconnection (OSI) model stack identifying a source or a destination of the data unit, and wherein the client side logical interface or the server side logical interface is configured to provide access to one or more protocols for modifying the identified source or destination of the data unit and for transmitting the data unit;
    translating, according to a routing table, between one or more client protocol interfaces and one or more server protocol interfaces; and
    facilitating transmission of the data unit via the connection comprising the tunnel.

12. The non-transitory machine-readable medium of claim 11, wherein the client side logical interface is one of plural client side logical interfaces coupled with the tunnel.

13. The non-transitory machine-readable medium of claim 12, wherein the client side logical interface resides externally to each of the plural clients of the client side logical interface.

14. The non-transitory machine-readable medium of claim 11, wherein the server side logical interface is one of plural server side logical interfaces coupled with the tunnel.

15. The non-transitory machine-readable medium of claim 14, wherein the server side logical interface resides externally to each of the plural servers of the server side logical interface.

16. The non-transitory machine-readable medium of claim 11, wherein the client side logical interface comprises a software interface without a corresponding hardware component.

17. The non-transitory machine-readable medium of claim 11, wherein the server side logical interface comprises a software interface without a corresponding hardware component.

18. The non-transitory machine-readable medium of claim 11, wherein the method further comprises:

facilitating specification, via protocol enhancement, of a protocol interface for communication within a channel of the tunnel, wherein the protocol interface is for a protocol for communication between the client side logical interface and the server side logical interface.

19. The non-transitory machine-readable medium of claim 11, wherein the one or more protocols for modifying the identified source or destination of the data unit comprise one or more protocols for replacing a header in a specified layer of an open systems interconnection (OSI) model stack for the data unit with a header associated with a modified source or a modified destination.

20. The non-transitory machine-readable medium of claim 11, wherein the one or more protocols for modifying the identified source or destination of the data unit comprise one or more protocols for causing the one or more processors to copy data blocks of a first layer of an open systems interconnection (OSI) model stack for the data unit into data blocks of a second layer of the open systems interconnection (OSI) model stack for the data unit, wherein the second layer is a higher number layer than the first layer.

21. A system comprising:

one or more modules configured to facilitate creation of a connection comprising a tunnel with one or more channels between a client side logical interface and a server side logical interface, wherein each channel is associated with a port forward of the client side logical interface and the server side logical interface, wherein the client side logical interface and the server side logical interface reside on opposite sides of a firewall, wherein the client side logical interface is for one or more client protocol interfaces, and wherein the server side logical interface is for one or more server protocol interfaces;

one or more modules configured to receive a data unit for transmission between one of plural clients of the client side logical interface and one of plural servers of the server side logical interface via the connection comprising the tunnel, wherein the data unit is associated with an open systems interconnection (OSI) model stack identifying a source or a destination of the data unit, and wherein the client side logical interface or the server side logical interface is configured to provide access to one or more protocols for modifying the identified source or destination of the data unit and for transmitting the data unit;

one or more modules configured to translate, according to a routing table, between one or more client protocol interfaces and one or more server protocol interfaces; and one or more modules configured to facilitate transmission of the data unit via the connection comprising the tunnel.

\* \* \* \* \*